(12) United States Patent
Kobayashi et al.

(10) Patent No.: US 12,709,393 B2
(45) Date of Patent: Aug. 18, 2026

(54) LAVATORY COMPARTMENT STRUCTURE OF AIRCRAFT

(71) Applicant: JAMCO CORPORATION, Mitaka (JP)

(72) Inventors: Masahiro Kobayashi, Tachikawa (JP); Toshihiro Mitsui, Tachikawa (JP)

(73) Assignee: JAMCO CORPORATION, Tokyo (JP)

( * ) Notice: Subject to any disclaimer, the term of this patent is extended or adjusted under 35 U.S.C. 154(b) by 4 days.

(21) Appl. No.: 19/104,509

(22) PCT Filed: Apr. 8, 2024

(86) PCT No.: PCT/JP2024/014215
§ 371 (c)(1),
(2) Date: Feb. 18, 2025

(87) PCT Pub. No.: WO2025/215692
PCT Pub. Date: Oct. 16, 2025

(65) Prior Publication Data
US 2026/0175979 A1 Jun. 25, 2026

(51) Int. Cl.
*B64D 11/02* (2006.01)
*B64D 11/00* (2006.01)
*E05B 39/04* (2006.01)

(52) U.S. Cl.
CPC .......... *B64D 11/02* (2013.01); *B64D 11/0023* (2013.01); *E05B 39/04* (2013.01)

(58) Field of Classification Search
CPC ............................ B64D 11/02; B64D 11/0023
See application file for complete search history.

(56) References Cited

U.S. PATENT DOCUMENTS

2014/0077033 A1* 3/2014 Scown .................. B64D 11/02 49/70
2014/0123571 A1* 5/2014 Swain ................ B64D 11/0023 29/401.1

(Continued)

FOREIGN PATENT DOCUMENTS

JP H10-121754 A 5/1998

OTHER PUBLICATIONS

International Search Report dated Jun. 18, 2024, issued in counterpart International Application No. PCT/JP2024/014215.

(Continued)

*Primary Examiner* — Richard G Davis
(74) *Attorney, Agent, or Firm* — Muncy, Geissler, Olds & Lowe, P.C.

(57) ABSTRACT

A lavatory compartment structure of an aircraft capable of realizing convenience of passengers using wheelchairs etc. while ensuring privacy without reducing the number of lavatory compartments is provided. In a lavatory compartment structure that may be installed of an aircraft, by operating a first operation member, the first operation member may be shifted to either an engaged state in which the first operation member is engaged to a second operation member or a separated state in which the first operation member is separated from the second operation member, and, in the engaged state, the second operation member may not be operated to move a locking portion from a lock position to an unlock position, and in the separated state, the second operation member may be operated to move the locking portion from the lock position to the unlock position.

7 Claims, 29 Drawing Sheets

(56) References Cited

U.S. PATENT DOCUMENTS

| | | | | |
|---|---|---|---|---|
| 2014/0291446 | A1* | 10/2014 | Reams | B64D 11/02 244/118.5 |
| 2018/0209185 | A1* | 7/2018 | Long | B64D 11/02 |
| 2021/0403165 | A1* | 12/2021 | Scoley | B64D 11/02 |
| 2024/0158082 | A1* | 5/2024 | Ruiz Lara | B64D 11/0023 |
| 2024/0167273 | A1* | 5/2024 | Worrasangasilpa | B64F 5/10 |

OTHER PUBLICATIONS

Written Opinion of the International Searching Authority dated Jun. 18, 2024, issued in counterpart International Application No. PCT/JP2024/014215.

* cited by examiner 21a
16b
15h
15k
21
15i
15m
16
15
15a
15b
15f
15d
15c
14b2
16a
22
22a

LAVATORY COMPARTMENT STRUCTURE OF AIRCRAFT

TECHNICAL FIELD

The present invention relates to a lavatory compartment structure of aircrafts.

BACKGROUND ART

Currently, passenger aircrafts having two or more aisles, called wide-body aircrafts, are required by law to have one or more lavatories, i.e., toilet booths on the aircraft, which may be used by passengers on wheelchairs. A common lavatory compartment for passengers is relatively small, for example having an external dimension of 38 in.×41 in., that is, 965 mm×1041 mm, in planar view, so it is difficult for passengers on wheelchairs to enter such a compartment.

Therefore, in order to enable easy use of the lavatory by passengers on wheelchairs, there are ideas on installing a large-sized compartment having an external dimension of 56 in.×41 in., that is, 1422 mm×1041 mm, which is somewhat larger than the common lavatory compartment, or to remodel a partition wall between compartments of two adjacently-arranged standard lavatories into a sliding door and connect the two lavatory compartments by opening the sliding door when a passenger on a wheelchair uses the lavatory, as disclosed in Patent Document 1.

CITATION LIST

Patent Document

[Patent Document 1] Japanese Patent Application Laid-Open Publication No. H10-121754

DISCLOSURE OF THE INVENTION

Problems to be Solved by the Invention

Since the space within a body of the aircraft is limited, if a large-sized lavatory compartment is to be installed for passengers using wheelchairs, the number of lavatory compartments will be reduced, such that convenience of passengers is deteriorated. Meanwhile, according to the lavatory structure of Patent Document 1, the number of lavatory compartments may be maintained, but there are drawbacks described below.

According to the lavatory structure of Patent Document 1, locking of the door of the lavatory compartment and the sliding door is enabled in an interlocked manner. Specifically, a configuration is adopted in which the locking of the sliding door is not enabled when the door of the lavatory compartment is not locked. Therefore, if neither of the lavatory compartments are used, the locking of the door from the inner side is not performed, such that a passenger may enter the lavatory compartment on the wheelchair and open the sliding door to use the lavatory.

Meanwhile, according to the lavatory structure of Patent Document 1, if the opening and closing of the sliding door is not desired, the sliding door must be locked by a separate operation as the locking of the respective doors, such that it is not convenient. If a user forgets to lock the sliding door, the passenger in the adjacent lavatory compartment may erroneously open the sliding door, and privacy cannot be ensured.

The present invention aims at solving such problems, and provides a lavatory compartment structure of an aircraft without reducing the number of lavatory compartments while realizing convenience of passengers using wheelchairs etc., and ensuring privacy.

Means of Solving the Problems

In order to achieve the objects described above, a lavatory compartment structure that may be installed on an aircraft according to the present invention includes:

a first lavatory compartment surrounded by a first housing;

a second lavatory compartment adjacent to the first lavatory compartment and surrounded by a second housing;

a movable wall that is movable between a closed position of closing a space between the first lavatory compartment and the second lavatory compartment and an open position of opening the space between the first lavatory compartment and the second lavatory compartment; and a main lock mechanism of the movable wall, wherein the first housing and the second housing constitute a lavatory housing, wherein the main lock mechanism includes:

a first operation member that is operable from one side of either the first lavatory compartment or the second lavatory compartment;

a second operation member that is operable from the other side of the first lavatory compartment or the second lavatory compartment; and a locking portion connected to the second operation member and that is movable between a lock position preventing movement of the movable wall with respect to the lavatory housing, and an unlock position enabling movement of the movable wall with respect to the lavatory housing, wherein, by operating the first operation member, the first operation member may be shifted to either an engaged state in which the first operation member is engaged to the second operation member or a separated state in which the first operation member is separated from the second operation member, and wherein, in the engaged state, the second operation member may not be operated to move the locking portion from the lock position to the unlock position, and in the separated state, the second operation member may be operated to move the locking portion from the lock position to the unlock position.

Effects of the Invention

According to the present invention, a lavatory compartment structure of an aircraft that enables to realize convenience of passengers using wheelchairs etc. while ensuring privacy without reducing the number of lavatory compartments may be provided.

MODE FOR CARRYING OUT THE INVENTION

Figure 1:
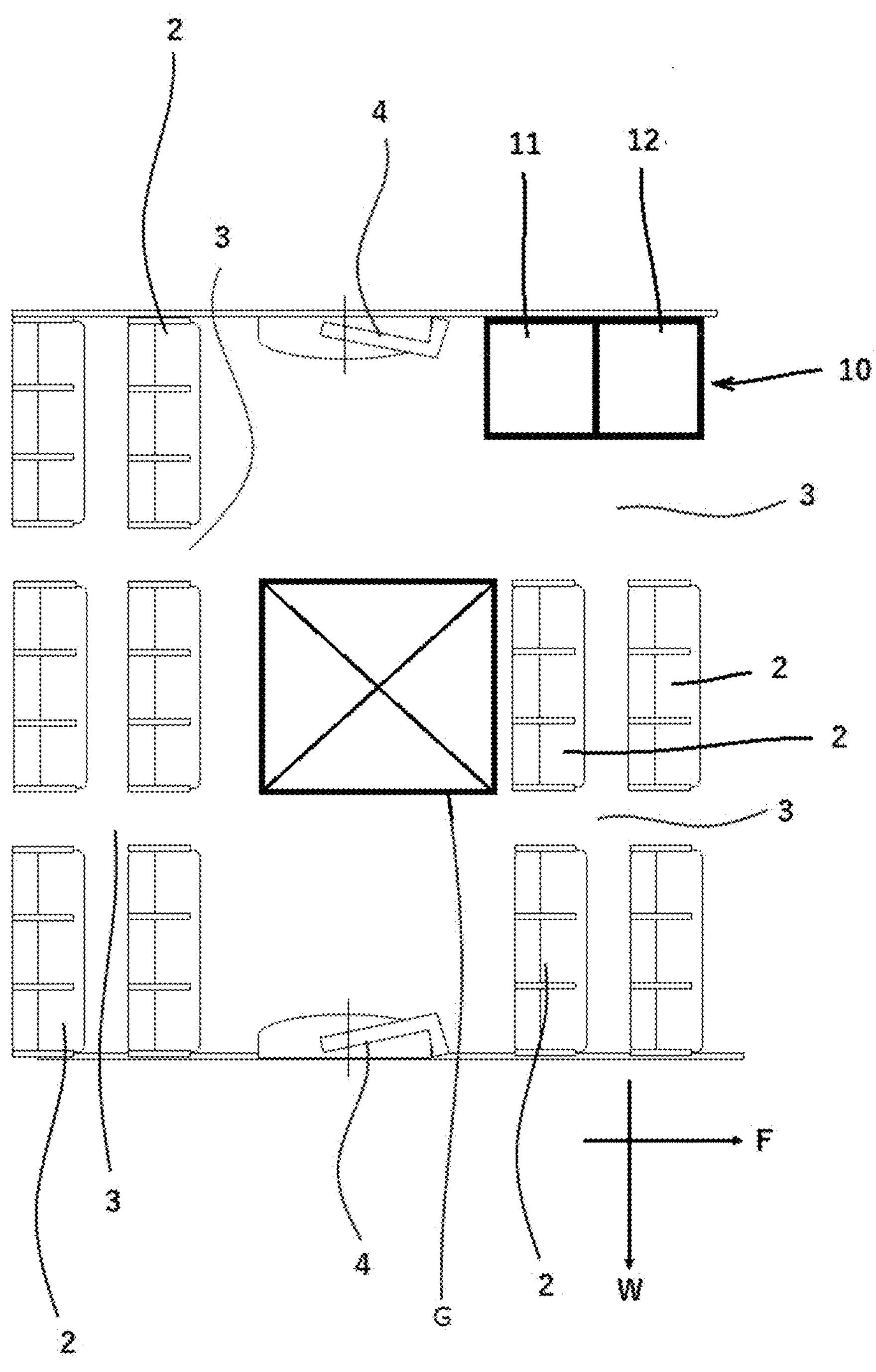
FIG. 1 is a plan view of a vicinity of a lavatory of an aircraft in enlarged view.

Now, a lavatory compartment structure that may be installed in an aircraft according to an embodiment of the present invention will be described with reference to the drawings. FIG. 1 is a plan view illustrating a vicinity of a lavatory of an aircraft 1 in enlarged view. A direction of travel of the aircraft is shown by arrow F in FIG. 1, and a width direction is shown by arrow W.

A cabin of the aircraft 1 has seat units 2 including three seats aligned in the width direction W, which are further aligned in three rows in the width direction W, and vertical aisles 3 are arranged between the seat units 2.

Aircraft doors 4 are arranged on both sides of the aircraft 1, with an area formed between the two aircraft doors 4 having a relatively wide space between the seat units 2 in the direction of travel F, forming an aisle referred to as a cross aisle connecting the aircraft doors 4 on both sides. In the present embodiment, a galley G is arranged on the cross aisle. Further, in a vicinity of one of the aircraft doors 4, a lavatory compartment structure 10 is installed next to the aircraft body, instead of the seat units 2. The lavatory compartment structure 10 may be installed on locations other than this location.

FIGS. 2 to 5 are plan views illustrating the lavatory compartment structure 10 according to the present embodiment in enlarged view. The lavatory compartment structure

10 includes two compartments, which are a first lavatory compartment 11 and a second lavatory compartment 12, aligned along the width direction W. The first lavatory compartment 11 includes a rear wall 11*a*, a front wall 11*e*, a side wall 11*c*, a ceiling 21A (refer to FIG. 6), and a floor 22A, which are joined together to form a first housing surrounding the first lavatory compartment 11. Further, the second lavatory compartment 12 includes a rear wall 12*a*, a front wall 12*e*, a side wall 12*c*, a ceiling 21B (refer to FIG. 6), and a floor 22B, which are joined together to form a second housing surrounding the second lavatory compartment 12.

The first housing and the second housing are individually carried into a body of the aircraft 1, joined together with an intermediate wall 14 interposed therebetween, and are installed as the lavatory compartment structure 10 having a hexahedron shape. In this state, the first housing and the second housing are joined and integrated, by which a lavatory housing is formed. The floors 22A and 22B in the lavatory housing are each fixed at four positions to the body, and the ceilings 21A and 21B are each fixed at one location to the body. In the following description, it is assumed that the ceiling 21A and the ceiling 21B are connected and integrated to constitute a ceiling 21, and the floor 22A and the floor 22B are connected and integrated to constitute a floor 22.

In the first lavatory compartment 11, a toilet bowl 11*b* is disposed so as to be in contact with the rear wall 11*a*, and a washstand 11*d* is disposed on the side wall 11*c* on an opposite side from the second lavatory compartment 12. The washstand 11*d* extends from the rear wall 11*a* to the front wall 11*e* facing an aisle 3. The front wall 11*e* extends from the side wall 11*c* to a predetermined distance in parallel with the rear wall 11*a*, and may be connected to a lavatory door 11*f*. The lavatory door 11*f* is connected by a hinge to a supporting wall 14*c*, and may open and close the space between the front wall 11*e* and the supporting wall 14*c* by pivoting.

In the second lavatory compartment 12, a toilet bowl 12*b* is provided so as to be in contact with the rear wall 12*a* aligned with the rear wall 11*a*, and a washstand 12*d* is disposed on the side wall 12*c* parallel to the side wall 11*c* on an opposite side from first second lavatory compartment 11. The washstand 12*d* extends from the rear wall 12*a* to the front wall 12*e* facing the aisle 3. The front wall 12*e* extends from the side wall 12*c* to a predetermined distance in parallel with the rear wall 12*a* opposing the front wall 12*e*, and may be connected to a lavatory door 12*f*. The lavatory door 12*f* is connected by a hinge to the supporting wall 14*c*, and may open and close the space between the front wall 12*e* and the supporting wall 14*c* by pivoting.

Figure 2:
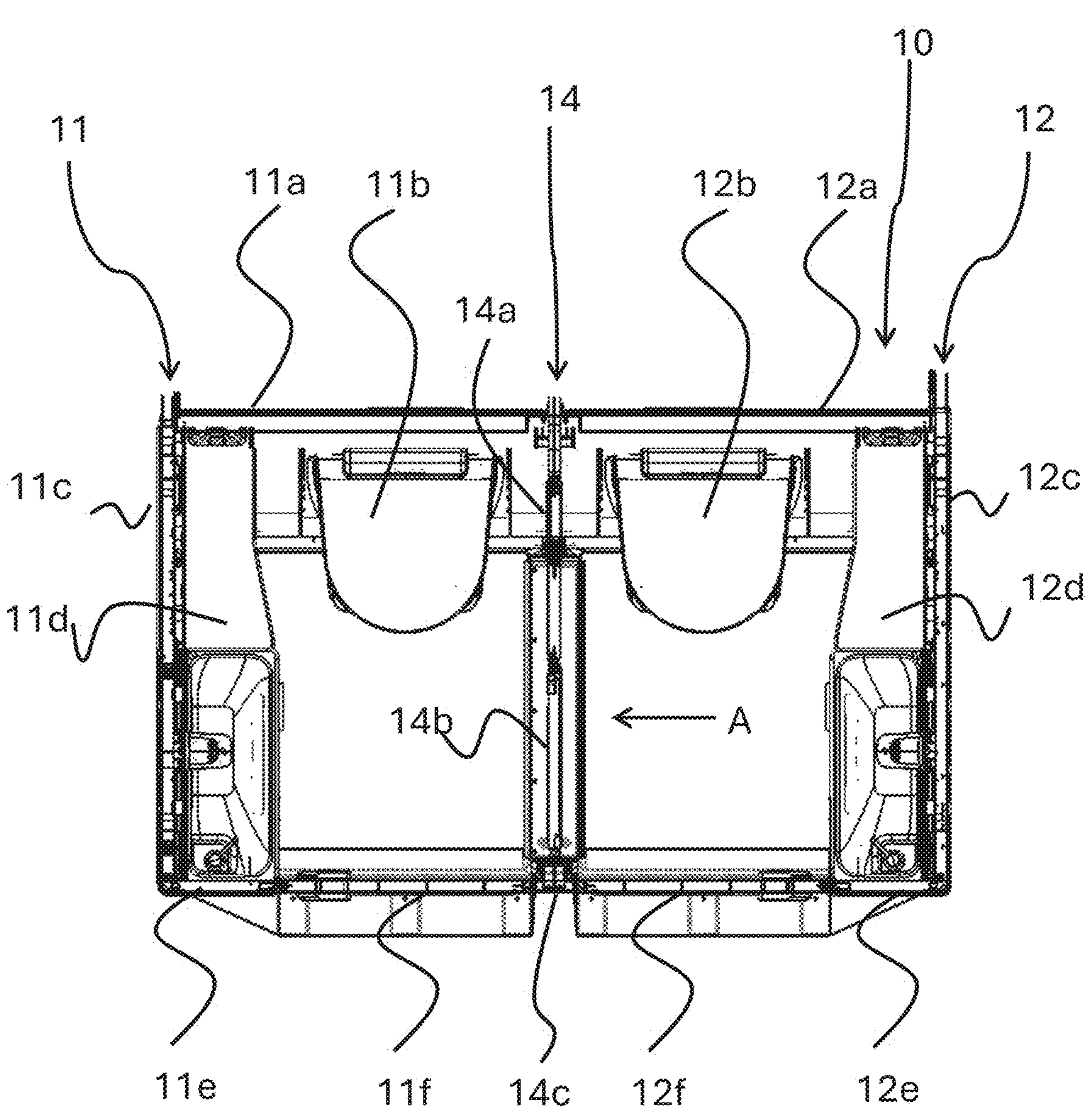
FIG. 2 is a plan view of a lavatory compartment structure according to an embodiment of the present invention in enlarged view, showing a state in which a movable wall is moved to a closed position.

The lavatory compartments 11 and 12 may have symmetrical shapes interposing the intermediate wall 14 illustrated in FIG. 2, wherein the toilet bowls and the washstands are arranged symmetrically interposing the intermediate wall 14. The intermediate wall 14 separates the lavatory compartments 11 and 12.

The intermediate wall 14 includes a fixed wall 14*a* that extends in parallel with the side walls 11*c* and 12*c* and that is fixed and connected to the rear walls 11*a* and 12*a*, a movable wall 14*b* that is movable with respect to the fixed wall 14*a*, and the supporting wall 14*c* on which an end edge of the movable wall 14*b* is supported pivotally.

Figure 6:
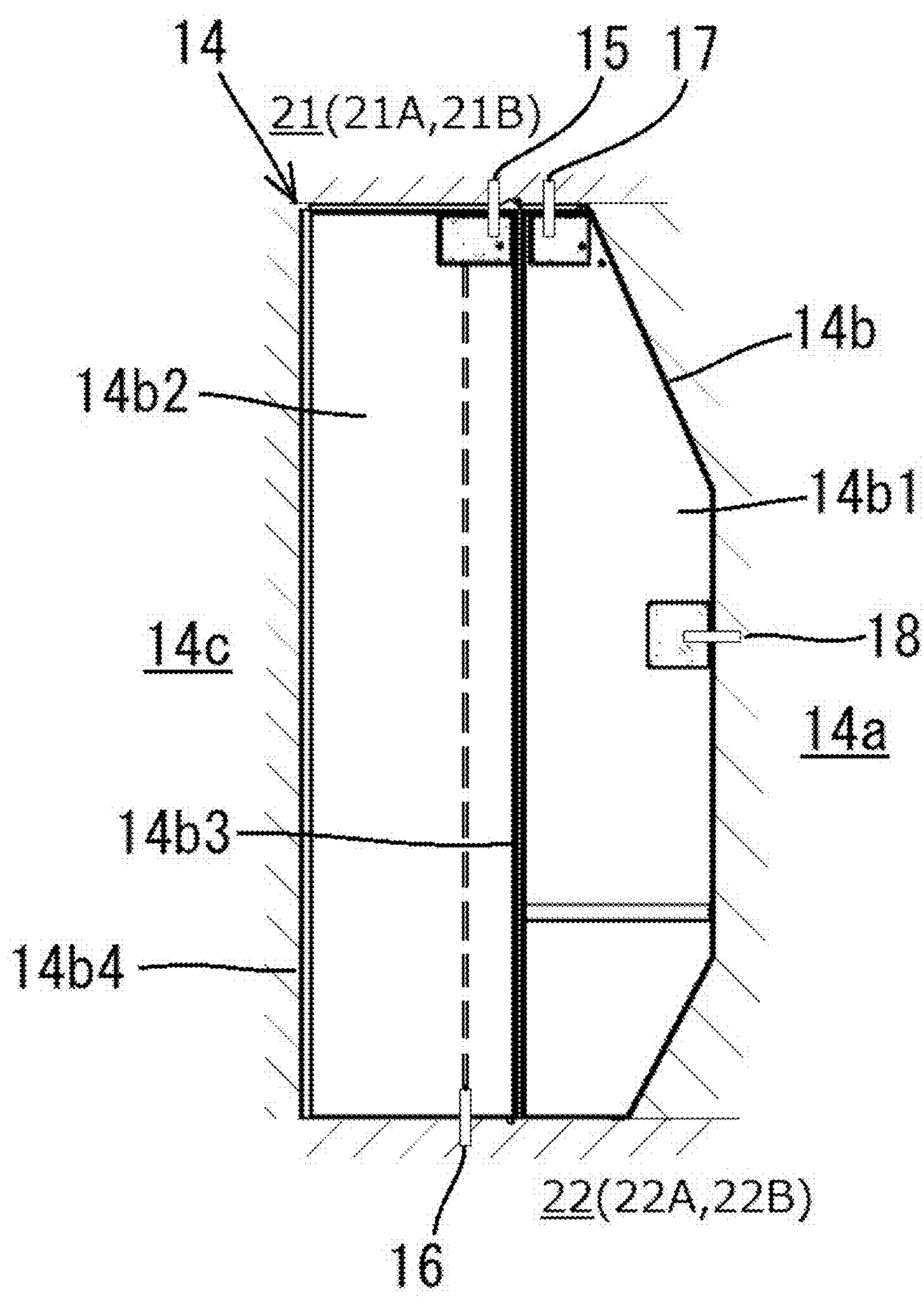
FIG. 6 is a view of an intermediate wall taken in an arrow A direction of FIG. 2.

FIG. 6 is a view illustrating the intermediate wall 14 in the arrow A direction of FIG. 2, wherein a first lock mechanism 15, a second lock mechanism 16, a third lock mechanism 17, and a fourth lock mechanism 18 are schematically illustrated. Upper and lower ends of the fixed wall 14*a* and the supporting wall 14*c* are fixed to the ceiling 21 and the floor 22. The first lock mechanism 15 and the second lock mechanism 16 constitute a main lock mechanism, and the third lock mechanism 17 and the fourth lock mechanism 18 constitute a sub-lock mechanism.

The movable wall 14*b* is a so-called accordion type folding door, including a first panel 14*b*1 having a hexagonal shape, a second panel 14*b*2 having a rectangular shape, a first hinge 14*b*3 that connects the first panel 14*b*1 and the second panel 14*b*2 in a manner capable of pivoting about an axis perpendicular to the floor 22, and a second hinge 14*b*4 that connects the second panel 14*b*2 and the supporting wall 14*c* in a manner capable of pivoting about an axis perpendicular to the floor 22. End edges where the first panel 14*b*1 and the second panel 14*b*2 oppose each other extend perpendicularly from the ceiling 21 to the floor 22.

The first panel 14*b*1 and the second panel 14*b*2 may pivot relatively with respect to each other by the first hinge 14*b*3 so as to protrude toward the second lavatory compartment 12 side and further folded such that the panels are positioned adjacently with each other. Further, the second panel 14*b*2 may pivot with respect to the supporting wall 14*c* via the second hinge 14*b*4, and by pivoting, the second panel 14*b*2 may be moved to a position adjacent to the lavatory door 12*f*. Thereby, the movable wall 14*b* may move between a closed position illustrated in FIG. 2 and an open position illustrated in FIG. 5.

Further, in the closed position illustrated in FIG. 6, the first panel 14*b*1 of the movable wall 14*b* is positioned without a gap formed between the end edge of the fixed wall 14*a*, the ceiling 21, and the floor 22, and the second panel 14*b*2 is positioned without a gap formed between the end edge of the supporting wall 14*c*, the ceiling 21, and the floor 22.

The first lock mechanism 15 is disposed near the upper end of the second panel 14*b*2, and the second lock mechanism 16 is disposed near the lower end of the second panel 14*b*2. Further, the third lock mechanism 17 is disposed near the upper end of the first panel 14*b*1, and the fourth lock mechanism 18 is disposed near the end edge of the first panel 14*b*1.

Figure 7:
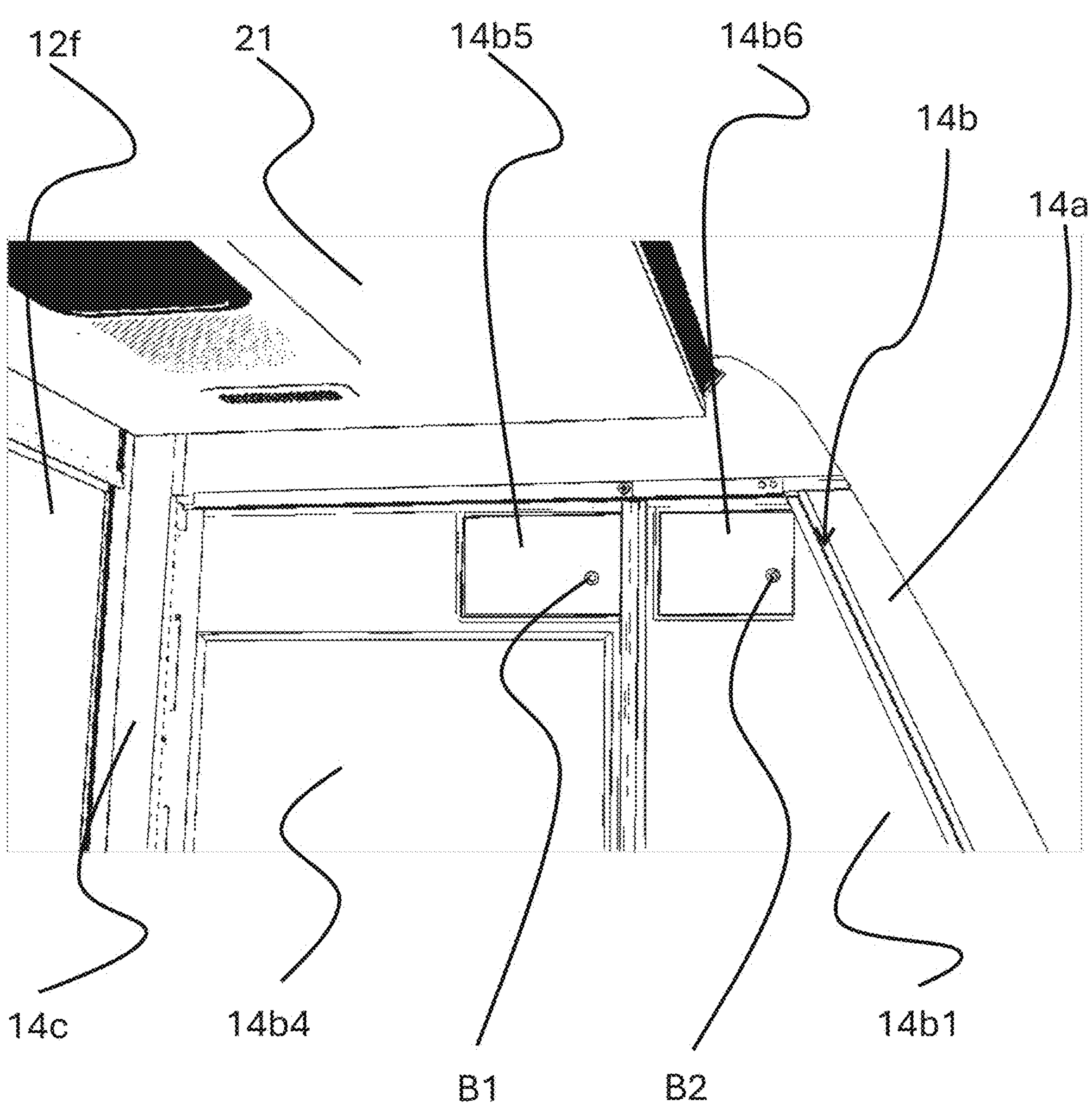
FIG. 7 is an enlarged view of a vicinity of an upper end of the movable wall viewed from a second lavatory compartment side, showing a state in which an access door is closed.
Figure 8:
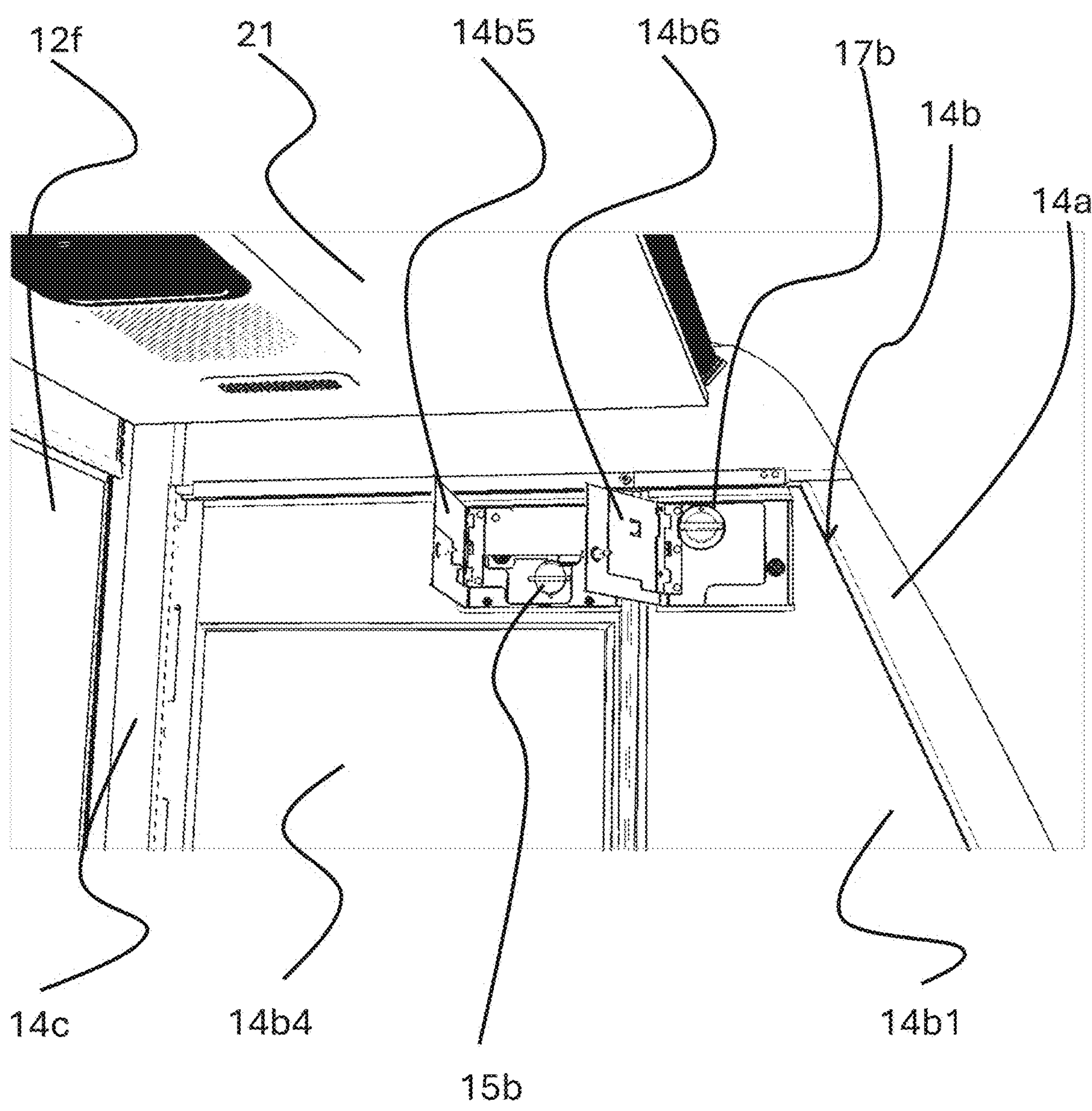
FIG. 8 is an enlarged view of the vicinity of the upper end of the movable wall viewed from the second lavatory compartment side, showing a state in which the access door is opened.
Figure 9:
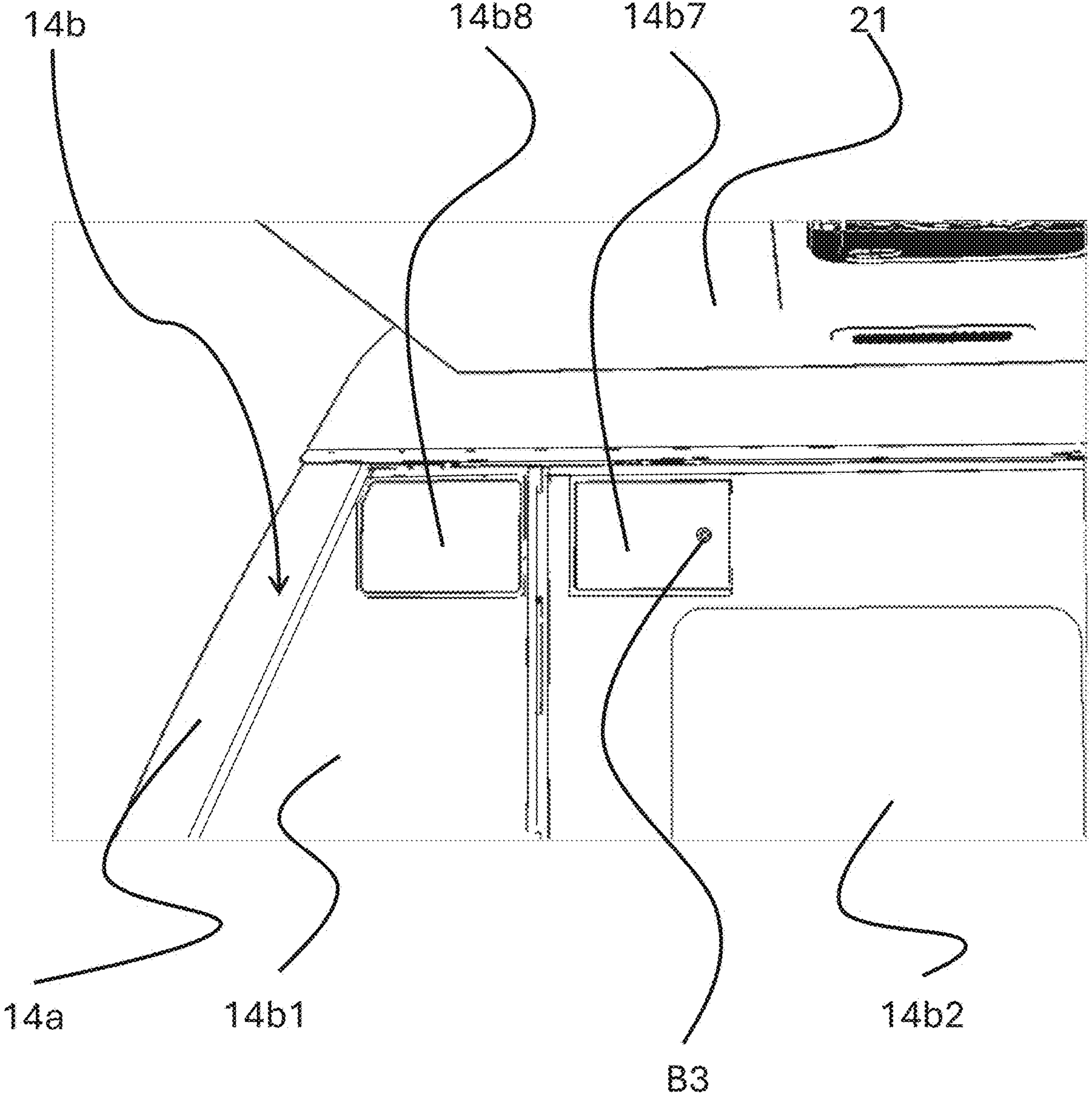
FIG. 9 is an enlarged view of the vicinity of the upper end of the movable wall viewed from a first lavatory compartment side, showing a state in which the access door is closed.
Figure 10:
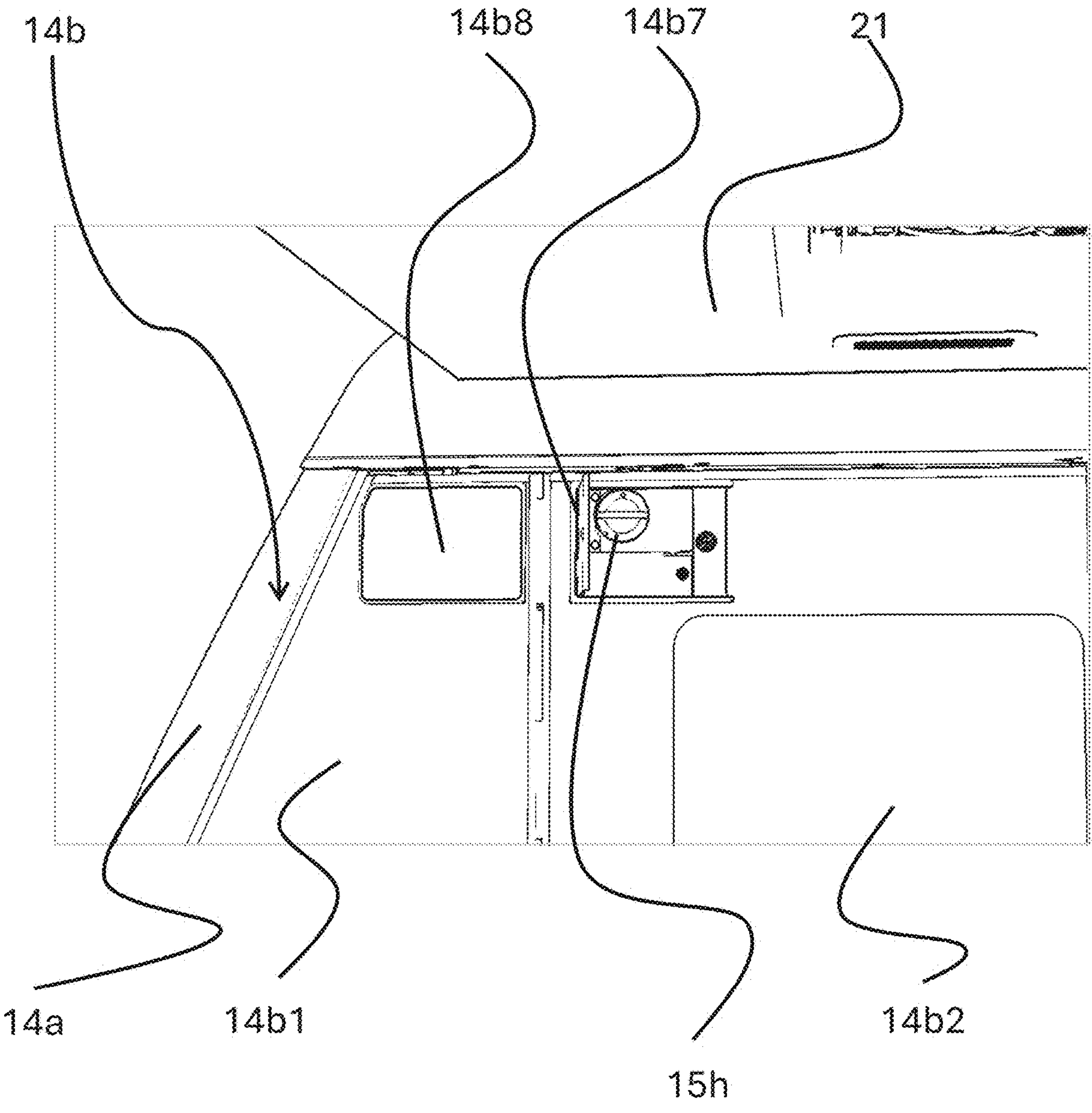
FIG. 10 is an enlarged view of the vicinity of the upper end of the movable wall viewed from the first lavatory compartment side, showing a state in which the access door is opened.
Figure 11:
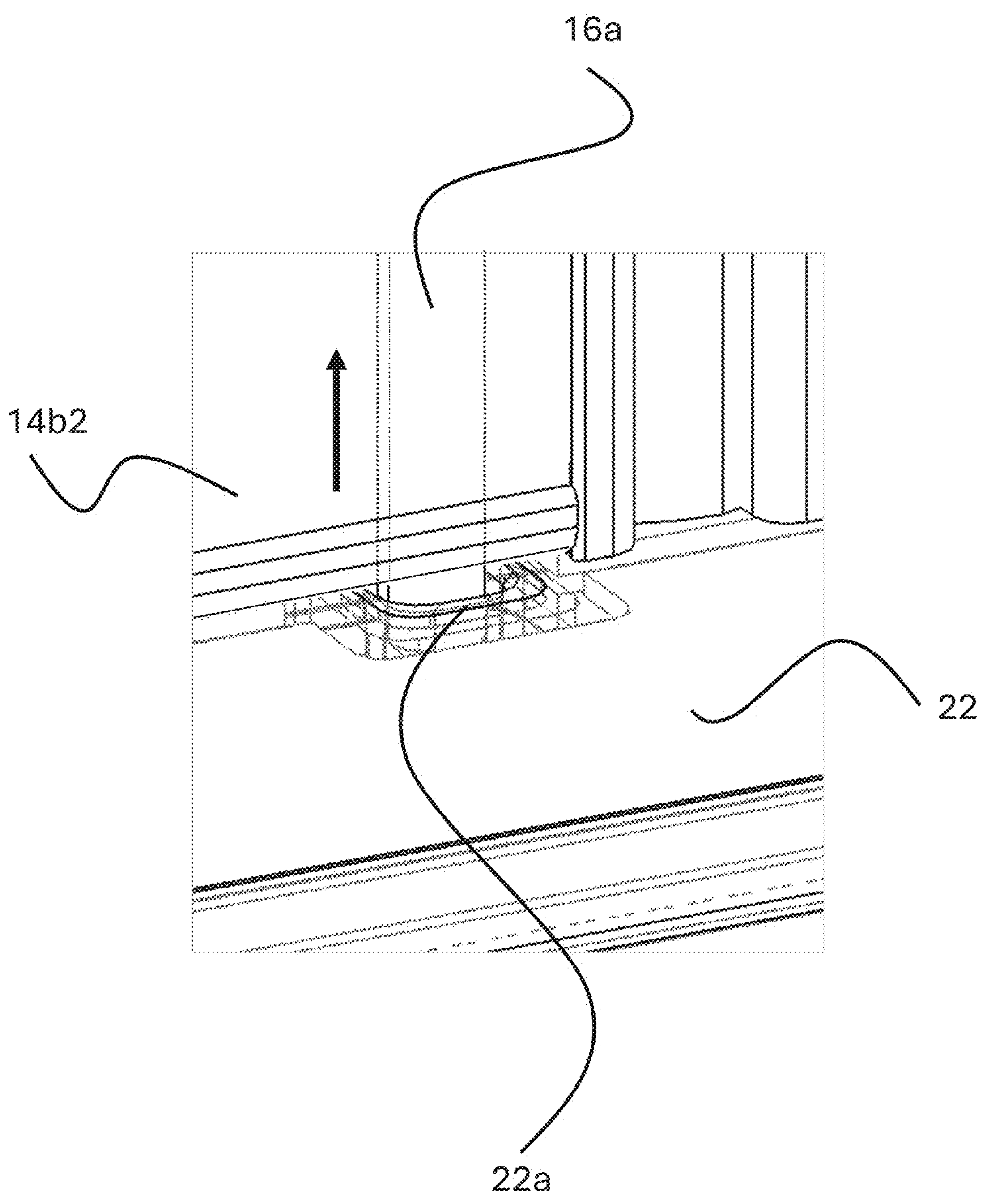
FIG. 11 is an enlarged view of a vicinity of a lower end of the movable wall viewed from the second lavatory compartment side, showing a locked state of a second lock mechanism.
Figure 12:
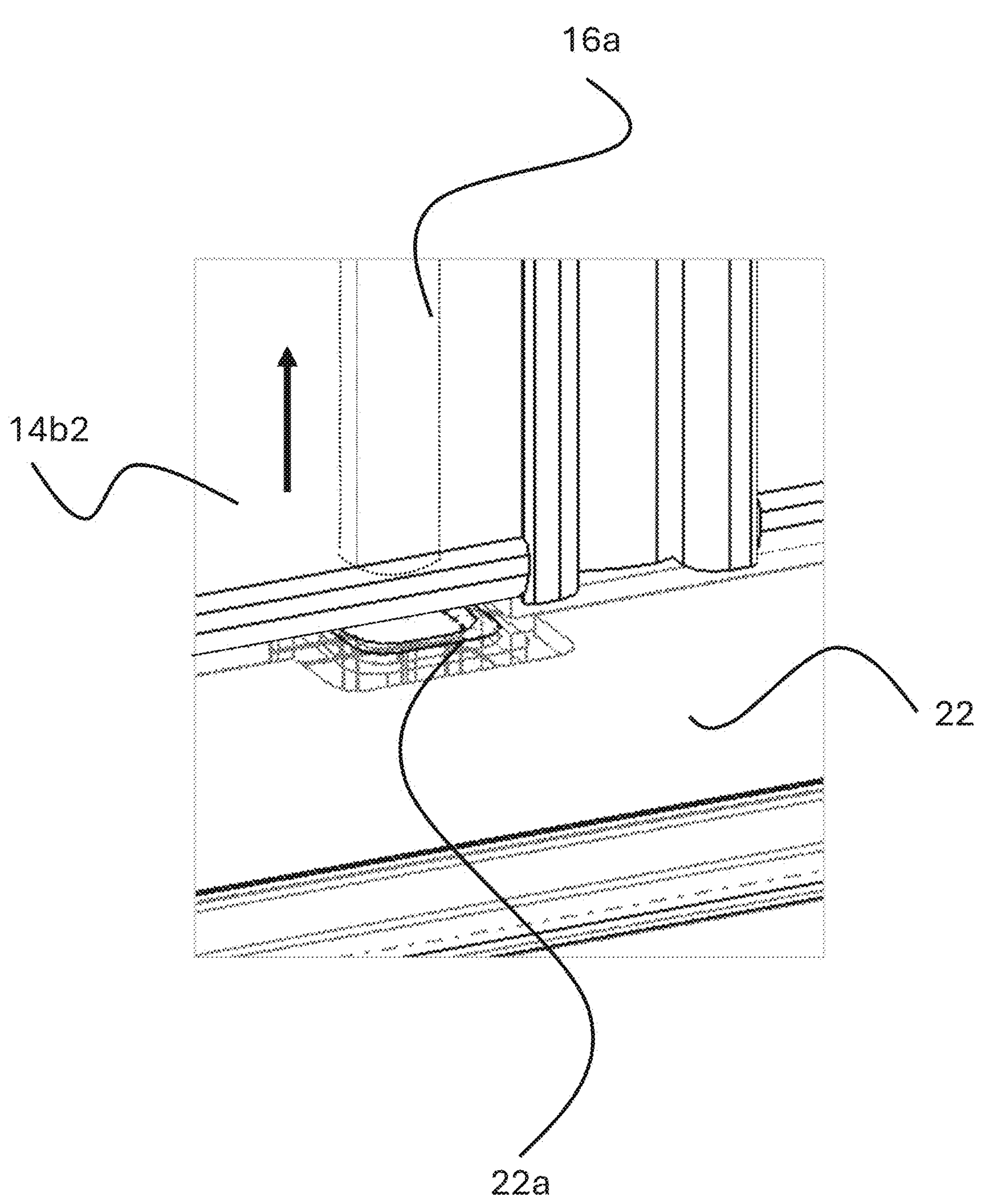
FIG. 12 is an enlarged view of the vicinity of the lower end of the movable wall viewed from the second lavatory compartment side, showing an unlocked state of the second lock mechanism.

FIGS. 7 and 8 are views illustrating a vicinity of an upper end of the movable wall 14*b* in enlarged view, taken from the second lavatory compartment 12 side. FIGS. 9 and 10 are views illustrating a vicinity of the upper end of the movable wall 14*b* in enlarged view, taken from the first lavatory compartment 11 side. FIGS. 11 and 12 are views illustrating a vicinity of the lower end of the movable wall 14*b* in enlarged view, taken from the second lavatory compartment 12 side.

As illustrated in FIG. 7, the second panel 14*b*2 includes a small-sized first access door 14*b*5 near the upper end of the second panel 14*b*2 positioned adjacent to the first panel 14*b*1 on the side wall of the second lavatory compartment 12. Further, the first panel 14*b*1 includes a small-sized second access door 14*b*6 near the upper end of the first panel 14*b*1 positioned adjacent to the second panel 14*b*1 on the side wall of the second lavatory compartment 12.

By pushing respective buttons B1 and B2, locking mechanisms not shown are released, and the first access door 14*b*5 and the second access door 14*b*6 will be in an open state as illustrated in FIG. 8 with respect to the second panel 14*b*2 and the first panel 14*b*1, such that cabin attendants etc. may access the interior thereof. Further, by closing each of the first access door 14*b*5 and the second access door 14*b*6 with respect to the second panel 14*b*2 and the first panel 14*b*1 and pushing the respective buttons B1 and B2, the locking mechanism is activated. Thereby, as illustrated in FIG. 7, the first access door **14*b*5 and the second access door 14*b*6 are maintained in a closed state with respect to the second panel 14*b*2 and the first panel 14*b*1, and cabin attendants etc. may not access the interior thereof. The first lock mechanism 15 is arranged in a space on the inner side of the first access door 14*b*5, and the third lock mechanism 17 is arranged in a space on the inner side of the second access door 14*b*6**.

As illustrated in FIG. 9, the second panel **14*b*2 includes a small-sized third access door 14*b*7 near the upper end of the second panel 14*b*2 positioned adjacent to the first panel 14*b*1 on the side wall of the first lavatory compartment 11. The third access door 14*b*7 is arranged to correspond to the first access door 14*b*5. That is, the first lock mechanism 15 is arranged on an interior of the second panel 14*b*2 between the first access door 14*b*5 and the third access door 14*b*7. By pushing a button B3, a locking mechanism not shown is released, and the third access door 14*b*7 will be in an open state as illustrated in FIG. 10 with respect to the second panel 14*b*2**, such that cabin attendants etc. may access the interior thereof.

Further, by closing the third access door **14*b*7 with respect to the second panel 14*b*2 and pushing the button B3, the locking mechanism is activated, and the third access door 14*b*7 will be maintained in a state closed with respect to the second panel 14*b*2, as illustrated in FIG. 9, such that cabin attendants etc. may not access the interior thereof. It may be possible to dispose a door 14*b*8 for inspection in an openable and closable manner in correspondence to the second access door 14*b*6 on the first panel 14*b*1 on the first lavatory compartment 11** side.

Figure 13:
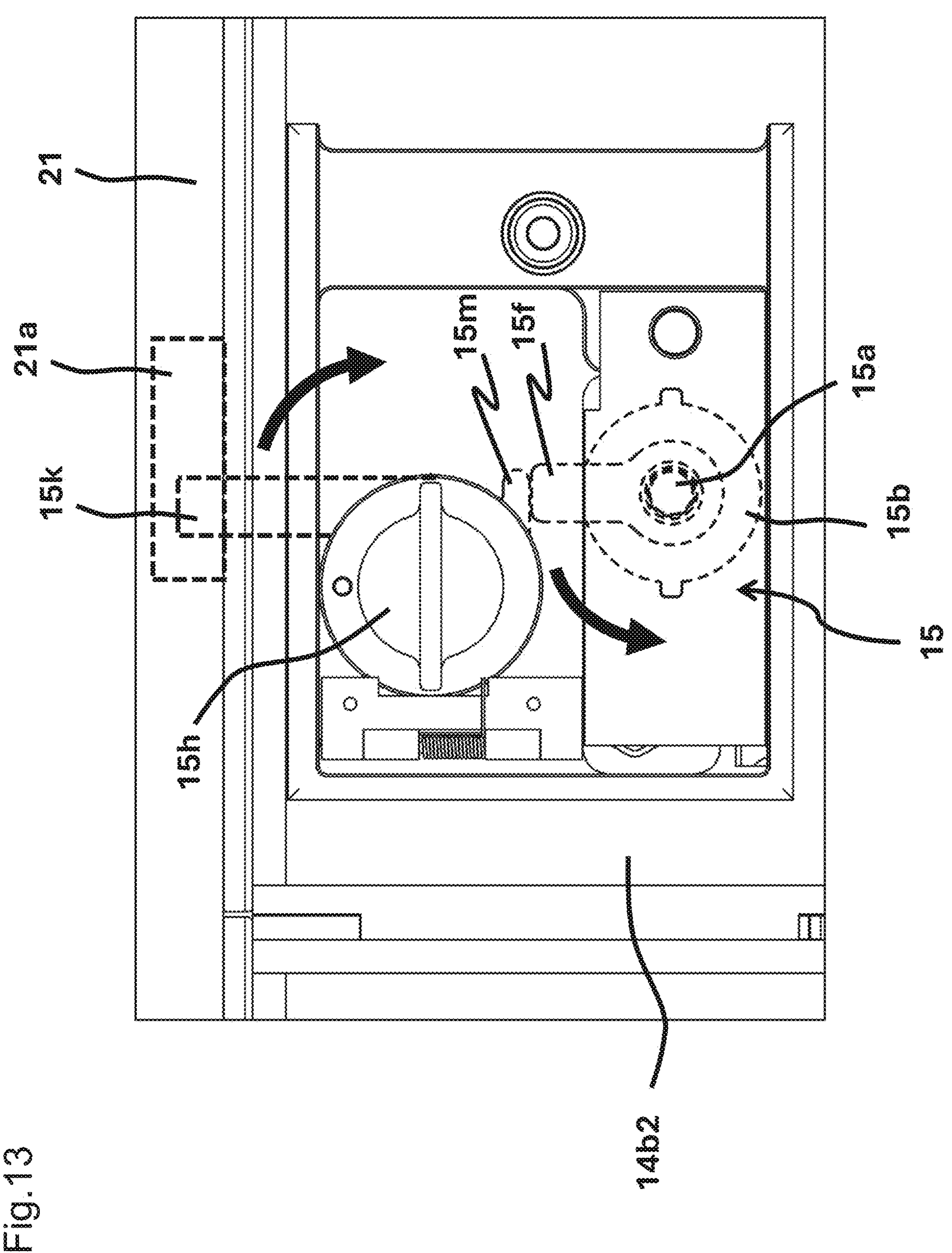
FIG. 13 is a view illustrating a first lock mechanism arranged within a space on an inner side of a second panel viewed from the first lavatory compartment side, showing a locked state.
Figure 14:
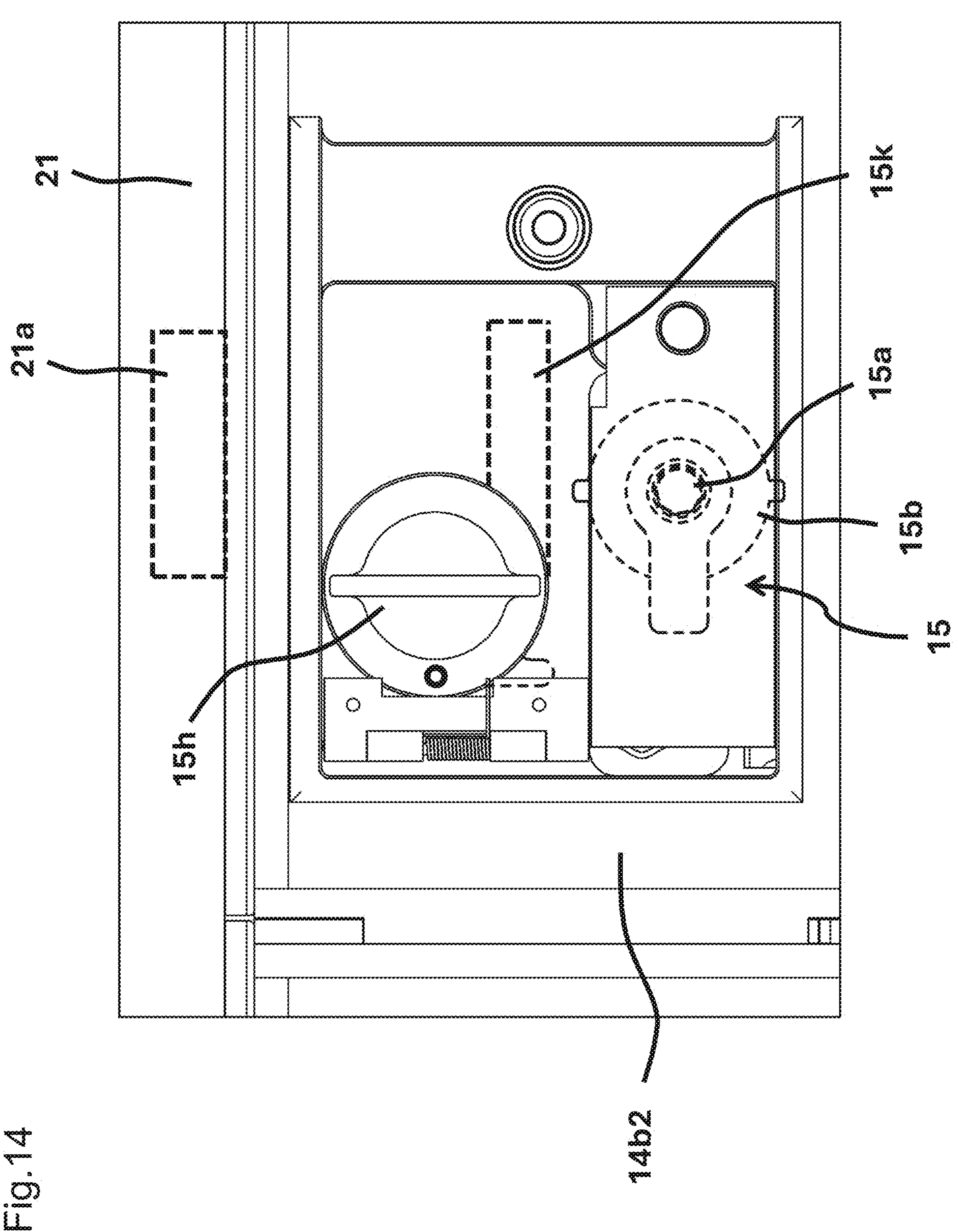
FIG. 14 is a view illustrating the first lock mechanism arranged within the space on the inner side of the second panel viewed from the first lavatory compartment side, showing an unlocked state.
Figure 17:
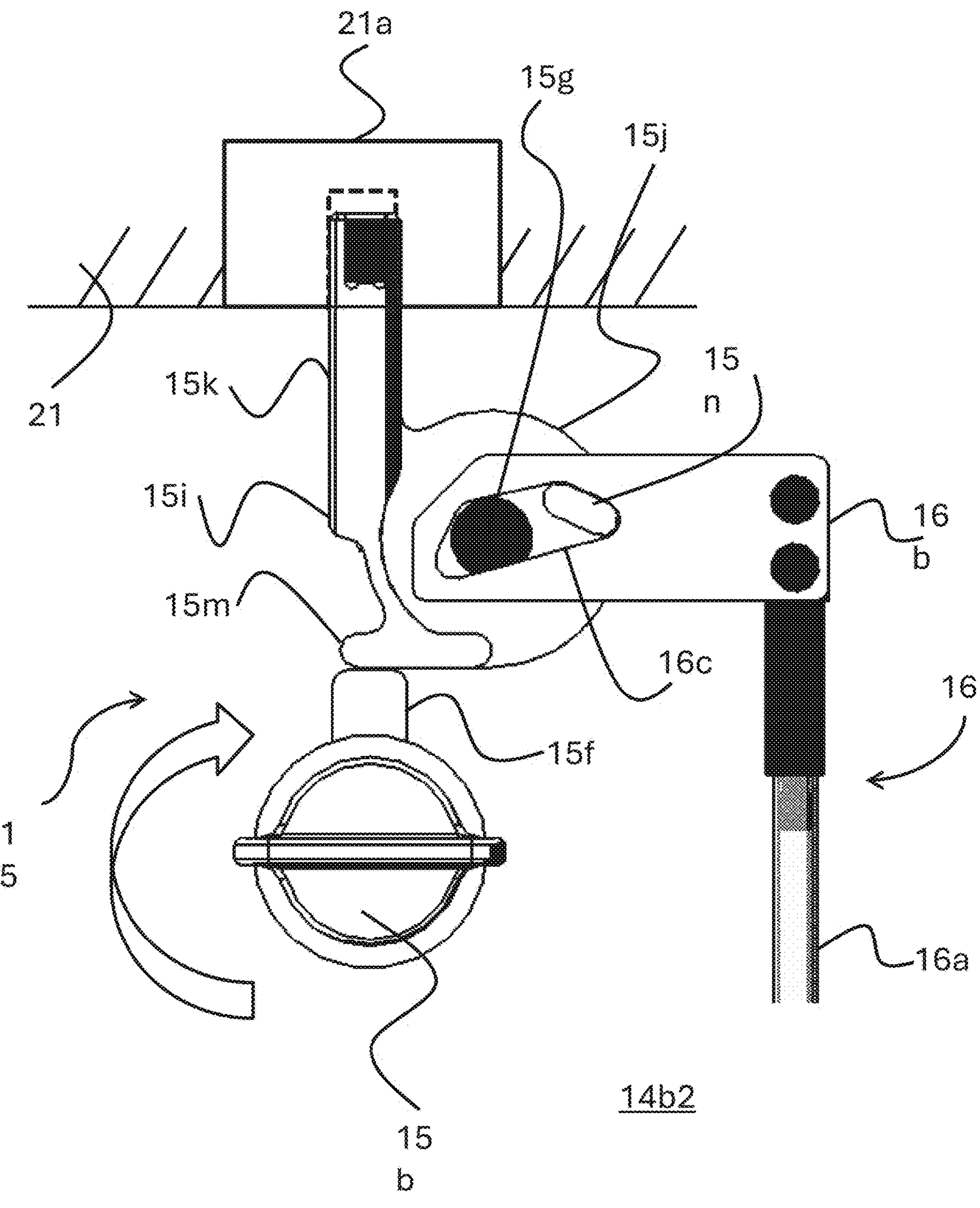
FIG. 17 is a view schematically illustrating the first lock mechanism viewed from the second lavatory compartment side, showing an engaged state of the first operation member.

FIGS. 13 and 14 illustrate the first lock mechanism 15 arranged in a space on the inner side of the second panel **14*b*2 when viewed from the first lavatory compartment 11 side. FIGS. 15A, 15B, 16A, and 16B illustrate the first lock mechanism 15 arranged in a space on the inner side of the second panel 14*b*2 when viewed from the second lavatory compartment 12 side. FIG. 17 is a view schematically illustrating the first lock mechanism 15 viewed from the second lavatory compartment 12 side, and FIGS. 18 and 19 are views schematically illustrating the first lock mechanism 15 and the second lock mechanism 16 viewed from the first lavatory compartment 11** side.

Figure 18:
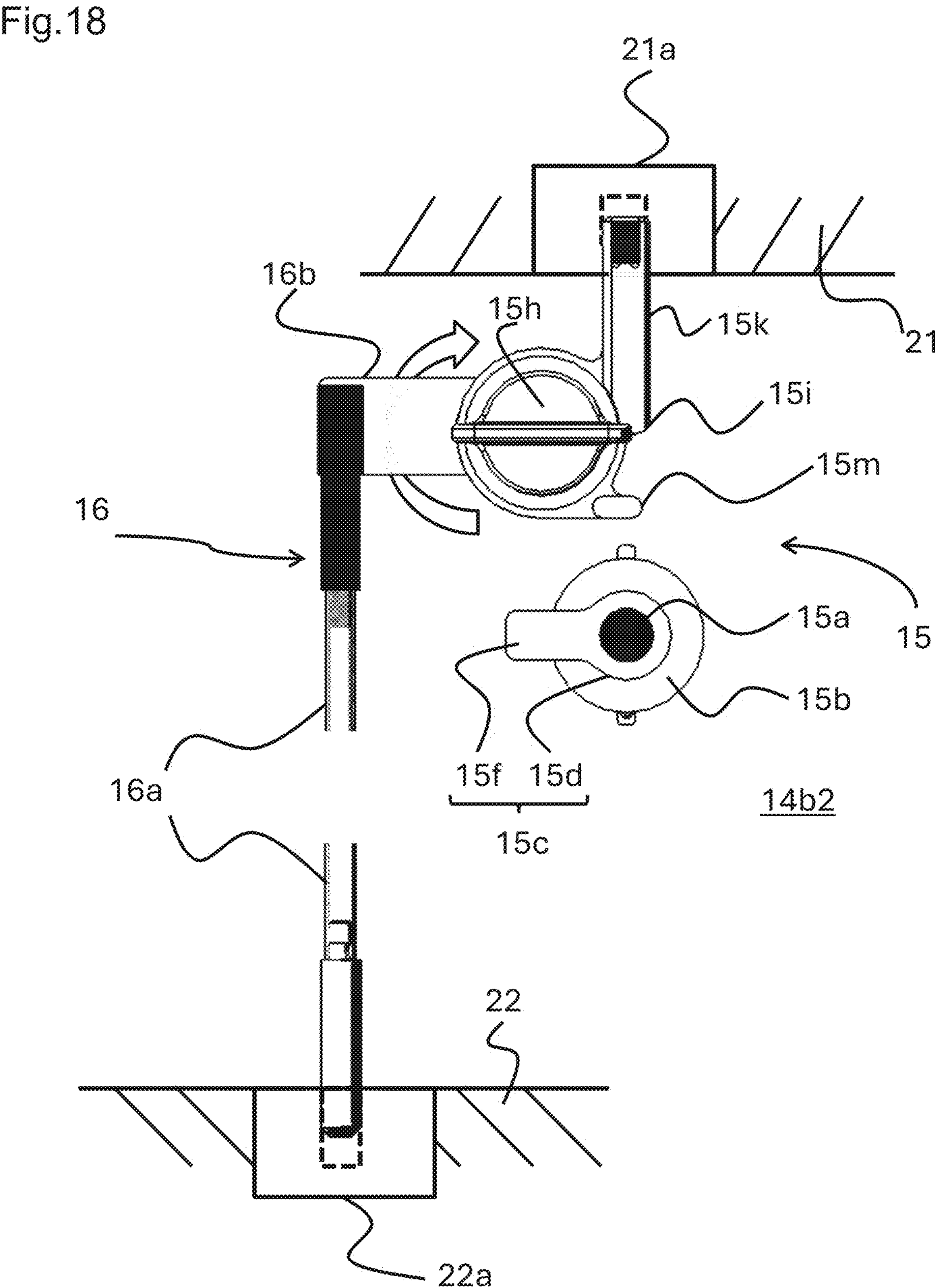
FIG. 18 is a view schematically illustrating the first lock mechanism and the second lock mechanism viewed from the first lavatory compartment side, showing a separated state of the first operation member and the locked state of the second operation member.
Figure 19:
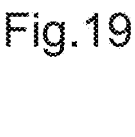
FIG. 19 is a view schematically illustrating the first lock mechanism and the second lock mechanism viewed from the first lavatory compartment side, showing the unlocked state of the second operation member.

In FIGS. 17 to 19, the first lock mechanism 15 includes a pivot shaft **15*a* that may pivot with respect to the second panel 14*b*2, a front side handle 15*b* fixed to the pivot shaft 15*a* on the second lavatory compartment 12 side, and a locking portion 15*c* that pivots together with the front side handle 15*b*. The locking portion 15*c* includes a disk shaped base portion 15*d*, and a protruded portion 15*f* that protrudes to a radial direction from the base portion 15*d*. The front side handle 15*b* and the locking portion 15*c*** constitute a first operation member.

Further, the first lock mechanism 15 includes a pivot shaft **15*g* that is disposed in a shifted manner toward the ceiling 21 side from the pivot shaft 15*a* and that may pivot with respect to the second panel 14*b*2, a back-side handle 15*h* fixed to the pivot shaft 15*g* on the first lavatory compartment 11 side, and a lock portion 15*i* that pivots together with the back-side handle 15*h*. The lock portion 15*i* includes a disk shaped base portion 15*j*, an engagement key 15*k* that extends in an elongated manner from the base portion 15*j* to a tangential direction of an outer circumference, and a hook portion 15*m* that extends in a short manner to the tangential direction of an outer circumference at a 90-degree phase with respect to the engagement key 15*k*. A bump portion 15*n* that protrudes in an axial direction of the pivot shaft 15*g* is formed on the base portion 15*j*. An engagement recess portion 21*a* having a slit shape is formed on the ceiling 21 in correspondence with the engagement key 15*k*. The back-side handle 15*h* and the lock portion 15*i* constitute a second operation member, and the engagement key 15*k* constitutes a locking portion. The second operation member may include a link plate 16*b* and a rod 16*a*** described below.

The second lock mechanism 16 includes the rod **16*a* that extends in the interior of the first panel 14*b*1 along the height direction of the first panel 14*b*1, and the link plate 16*b* fixed and connected to an upper end of the rod 16*a*. The link plate 16*b* includes a long hole 16*c* formed to extend away from the rod 16*a*. The pivot shaft 15*g* and the bump portion 15*n* are accommodated relatively movably within the long hole 16*c*, and according to a rotation angle of the base portion 15*j*, the bump portion 15*n* pushes the inner circumference of the long hole 16*c*, and thereby, the rod 16*a* may be lifted and lowered through the link plate 16*b*. An engagement recess portion 22*a* having a slit shape is formed on the floor 22 in correspondence with the lower end of the rod 16*a***.

The first lock mechanism 15 and the second lock mechanism 16 are interlocked. The interlocked state will be described in detail. As illustrated in FIG. 18, in a state where the back-side handle **15*h* is pivoted to a position where the engagement key 15*k* enters the engagement recess portion 21*a*, i.e., lock position, the hook portion 15*m* is in a horizontal state. In such a state, the rod 16*a* descends via the link plate 16*b*, and the lower end thereof enters the engagement recess portion 22*a* (FIG. 11). That is, the first lock mechanism 15 and the second lock mechanism 16 are in a locked state, and the first panel 14*b*1 will be in a locked state locked to the ceiling 21 and the floor 22**.

In the locked state, as illustrated in FIG. 17, the front side handle **15*b* may be pivoted such that the protruded portion 15*f* points directly above. Then, a tip of the protruded portion 15*f* abuts against a side edge of the hook portion 15*m*, and thereby, the base portion 15*j* and the back-side handle 15*h* will no longer pivot toward the direction to be released from the locked state. In other words, by pivoting the front side handle 15*b* to the position illustrated in FIG. 17, the locked state of the first lock mechanism 15 and the second lock mechanism 16, i.e., an engaged state in which the first operation member is engaged with the second operation member, will be maintained, and the back-side handle 15*h* may not be pivoted unless the front side handle 15*b* is pivoted, such that the locked state of the first lock mechanism 15 and the second lock mechanism 16** will not be released.

Meanwhile, when the front side handle **15*b* is pivoted to a position illustrated in FIG. 18, the tip of the protruded portion 15*f* points to the horizontal direction, and the protruded portion 15*f* is separated from a side edge of the hook portion 15*m*, i.e., a separated state in which the first operation member is separated from the second operation member, such that the back-side handle 15*h* may be pivoted to the position illustrated in FIG. 19. Thereby, the engagement key 15*k* pivots and moves to a position separated from the engagement recess portion 21*a*, i.e., unlock position, and the rod 16*a* is lifted to an unlocked state separated from the engagement recess portion 22*a* (FIG. 12). In such a state, the second panel 14*b*2 becomes relatively movable with respect to the ceiling 21 and the floor 22. From the viewpoint of preventing erroneous operation, when the engagement key 15*k* is separated from the engagement recess portion 21*a*, even if the front side handle 15*b* is attempted to be returned from the position illustrated in FIG. 19 to the position illustrated in FIG. 17, the protruded portion 15***f* may be made to interfere with the engagement key 15*k* such that the front side handle 15*b* will not return to position. That is, the first operation member may be enabled to shift from the separated state to the engaged state only when the locking portion is at the lock position.

Figure 20A:
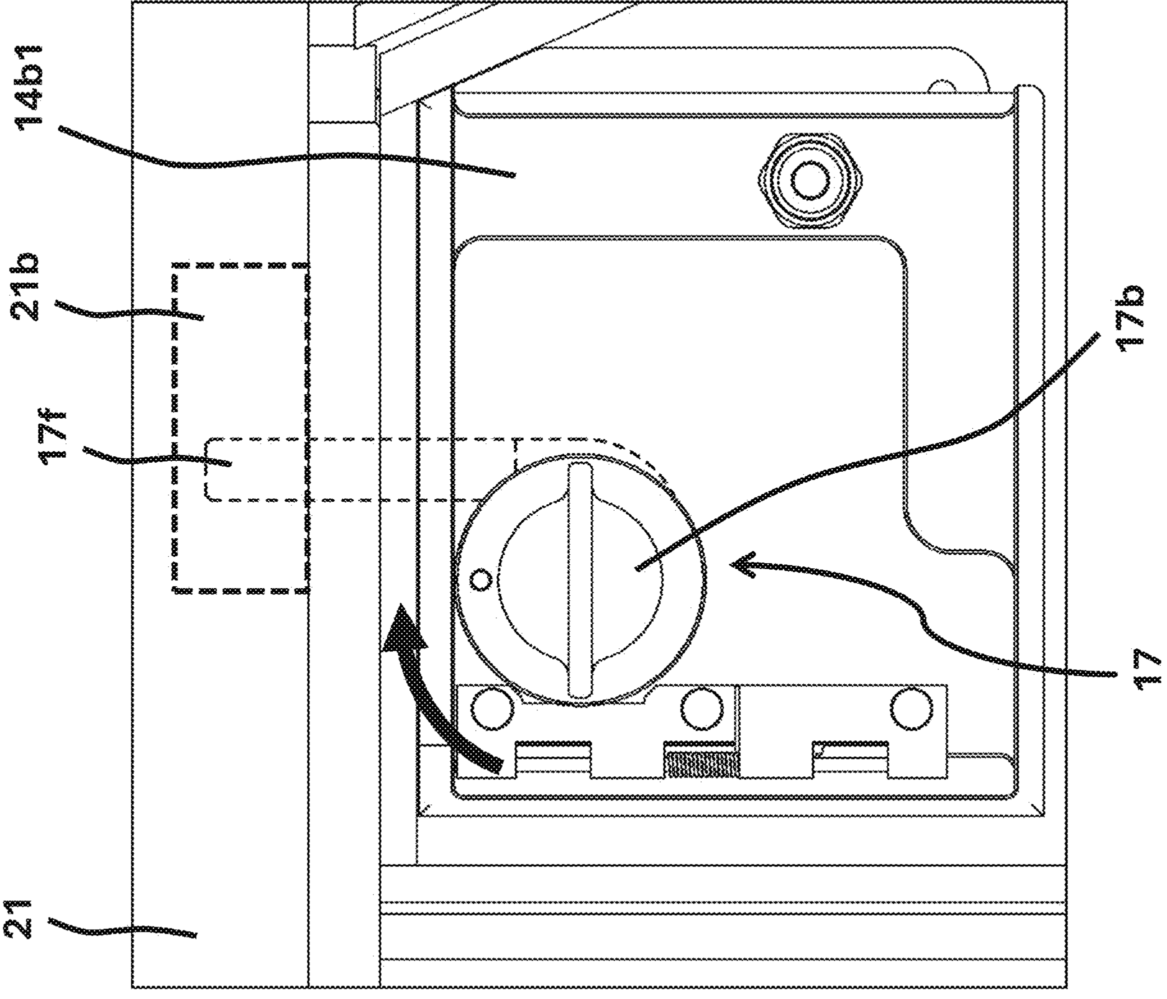
FIG. 20A is a view illustrating a third lock mechanism arranged within a space on an inner side of a first panel viewed from a second lavatory compartment side, showing a locked state.
Figure 20B:
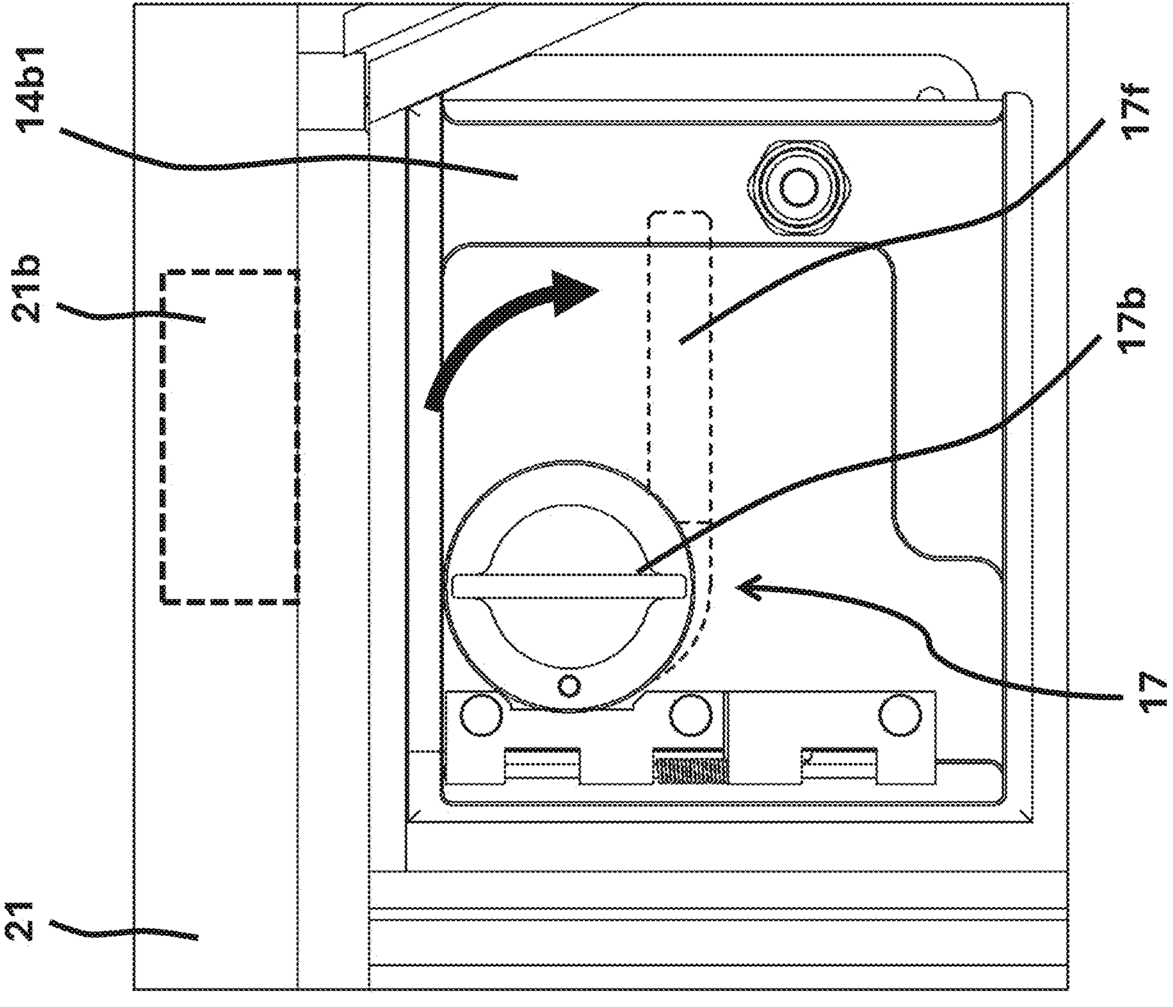
FIG. 20B is a view illustrating the third lock mechanism arranged within the space on the inner side of the first panel viewed from the second lavatory compartment side, showing an unlocked state.
Figure 21:
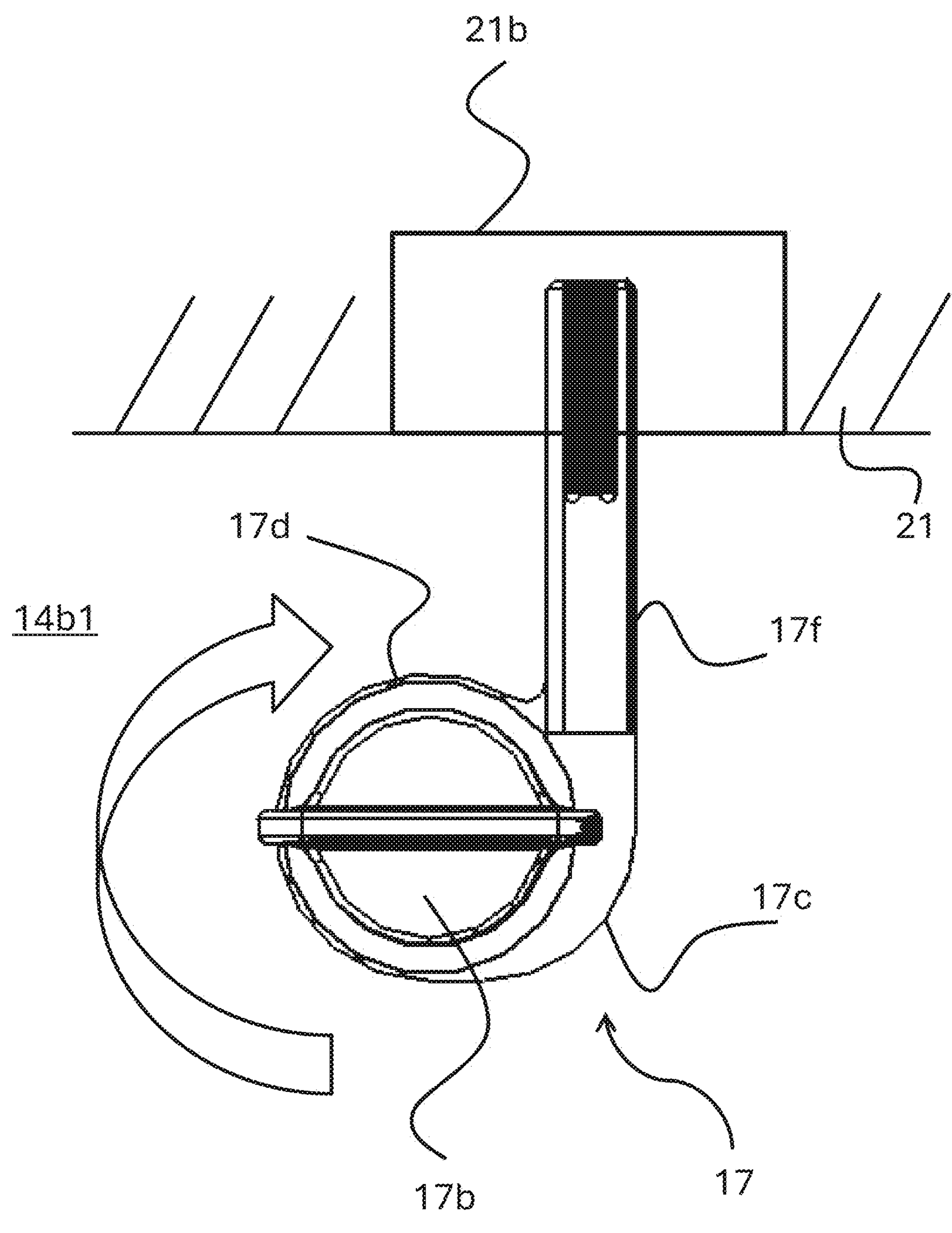
FIG. 21 is a view illustrating the third lock mechanism viewed from the second lavatory compartment side, showing the locked state.
Figure 22:
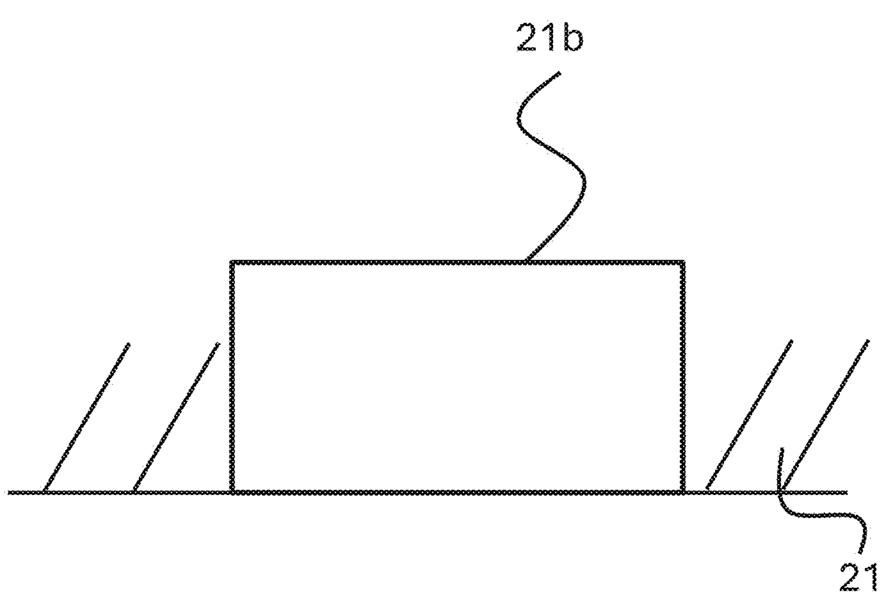
FIG. 22 is a view illustrating the third lock mechanism viewed from the second lavatory compartment side, showing the unlocked state.
Figure 22:
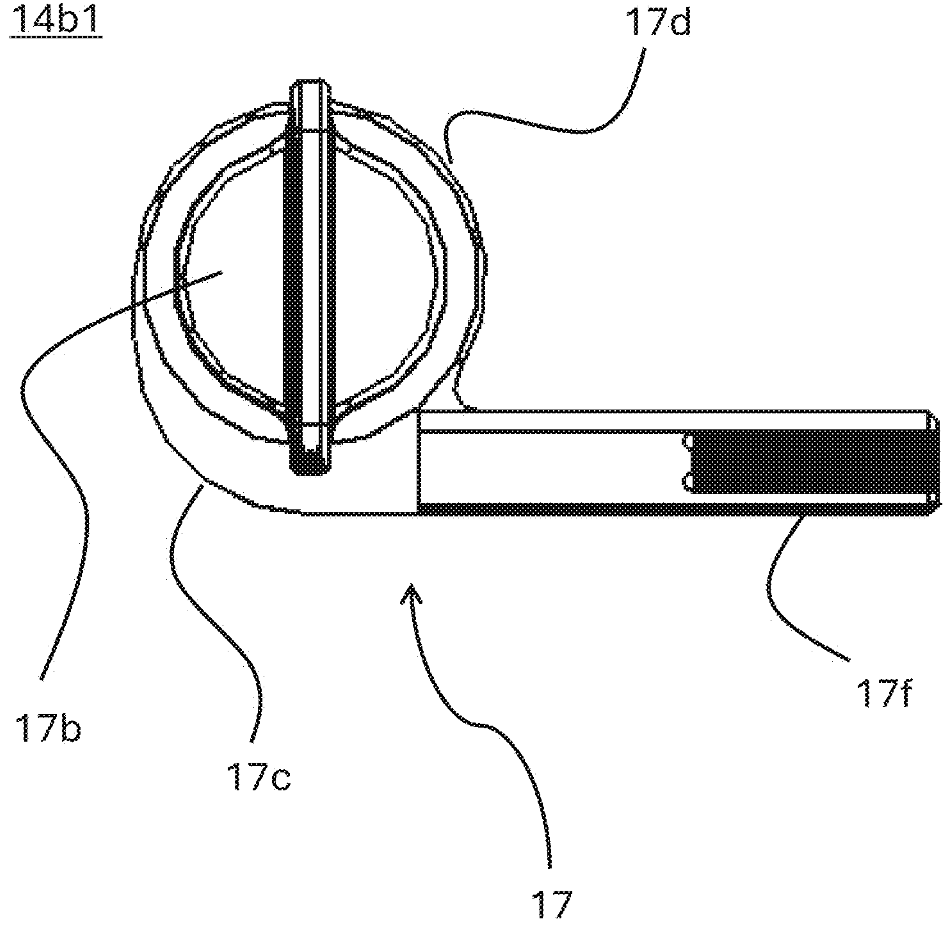

FIGS. 20A and 20B are views illustrating the third lock mechanism 17 arranged within the space on the inner side of the first panel 14*b*1 viewed from the second lavatory compartment 12 side. FIGS. 21 and 22 are views schematically illustrating the third lock mechanism 17 viewed from the second lavatory compartment 12 side.

FIGS. 21 and 22, the third lock mechanism 17 includes a pivot shaft (not shown) capable of pivoting with respect to the first panel 14*b*1, a handle 17*b* fixed to the pivot shaft on the second lavatory compartment 12 side, and a cam portion 17*c* that pivots together with the handle 17*b*. The cam portion 17*c* includes a disk shaped base portion 17*d*, and an engagement key 17*f* that extends from the base portion 17*d* in a tangential direction of an outer circumference. In response to the engagement key 17*f*, a slit shaped engagement recess portion 21*b* is formed on the ceiling 21.

When the handle 17*b* is pivoted to the position illustrated in FIG. 21, a tip of the engagement key 17*f* points directly above, and enters the engagement recess portion 21*b*. Thereby, the first panel 14*b*1 will be relatively unmovable with respect to the ceiling 21. Meanwhile, in a state where the handle 17*b* is pivoted to the position illustrated in FIG. 22, the engagement key 17*f* points to the horizontal direction and separates from the engagement recess portion 21*b*, such that the first panel 14*b*1 will be relatively movable with respect to the ceiling 21.

Figure 23:
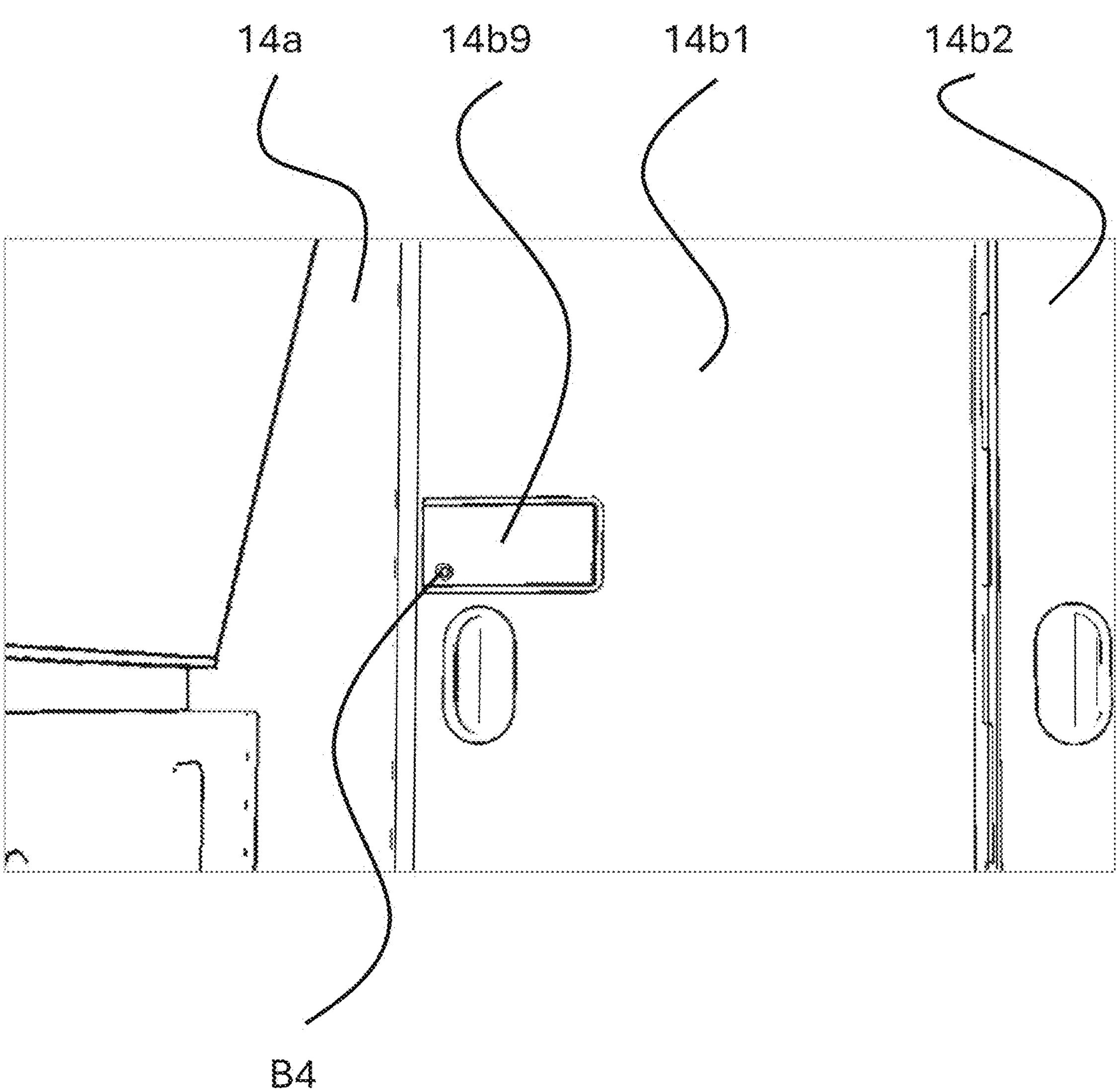
FIG. 23 is a view illustrating an enlarged view of a vicinity of a center of a side portion of the movable wall viewed from the first lavatory compartment side, showing a state where the access door is closed.
Figure 24:
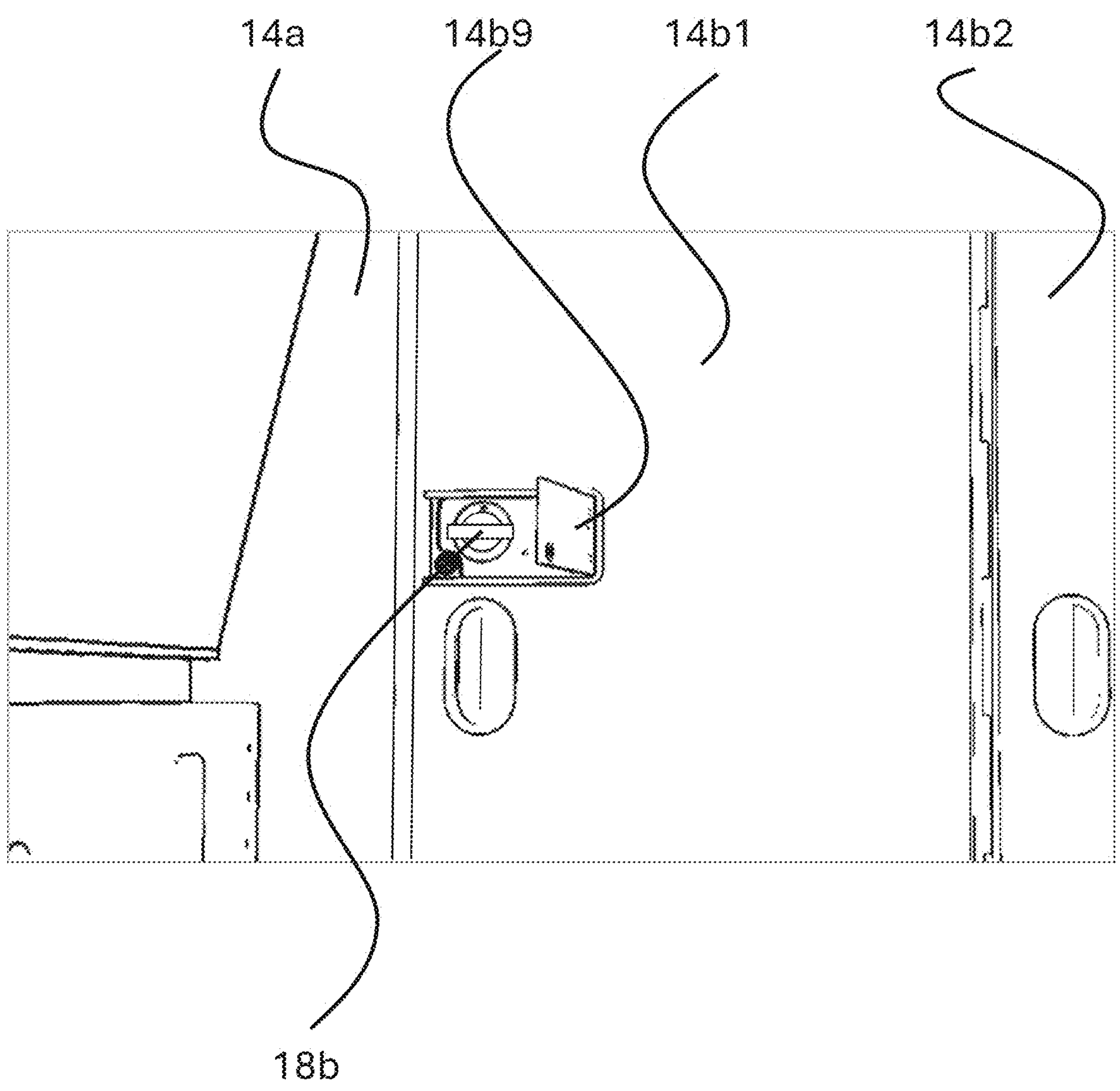
FIG. 24 is a view illustrating an enlarged view of the vicinity of the center of the side portion of the movable wall viewed from the first lavatory compartment side, showing a state where the access door is opened.
Figure 25A:
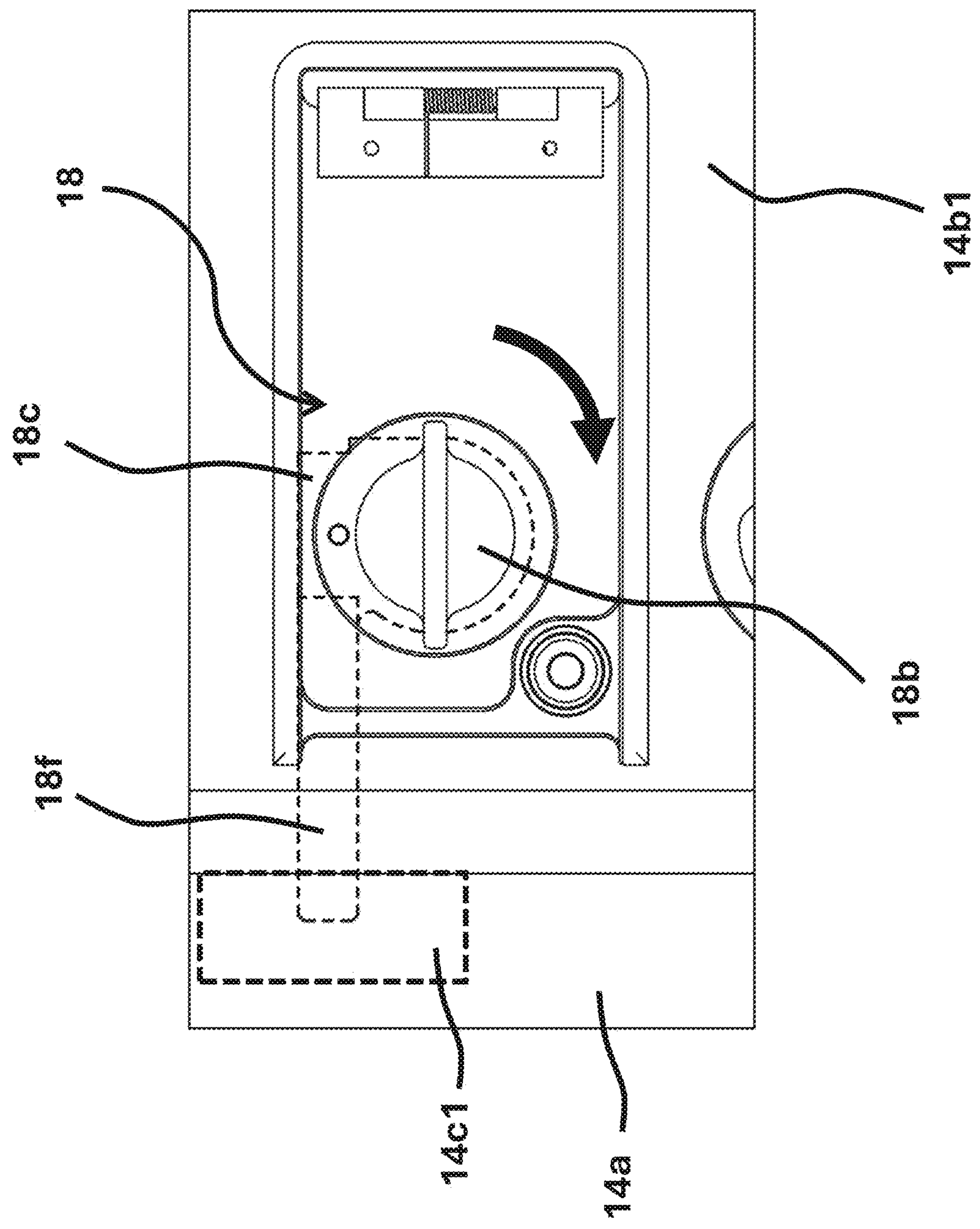
FIG. 25A is a view illustrating a fourth lock mechanism arranged within a space on an inner side of the first panel viewed from the first lavatory compartment side, showing a locked state.
Figure 25B:
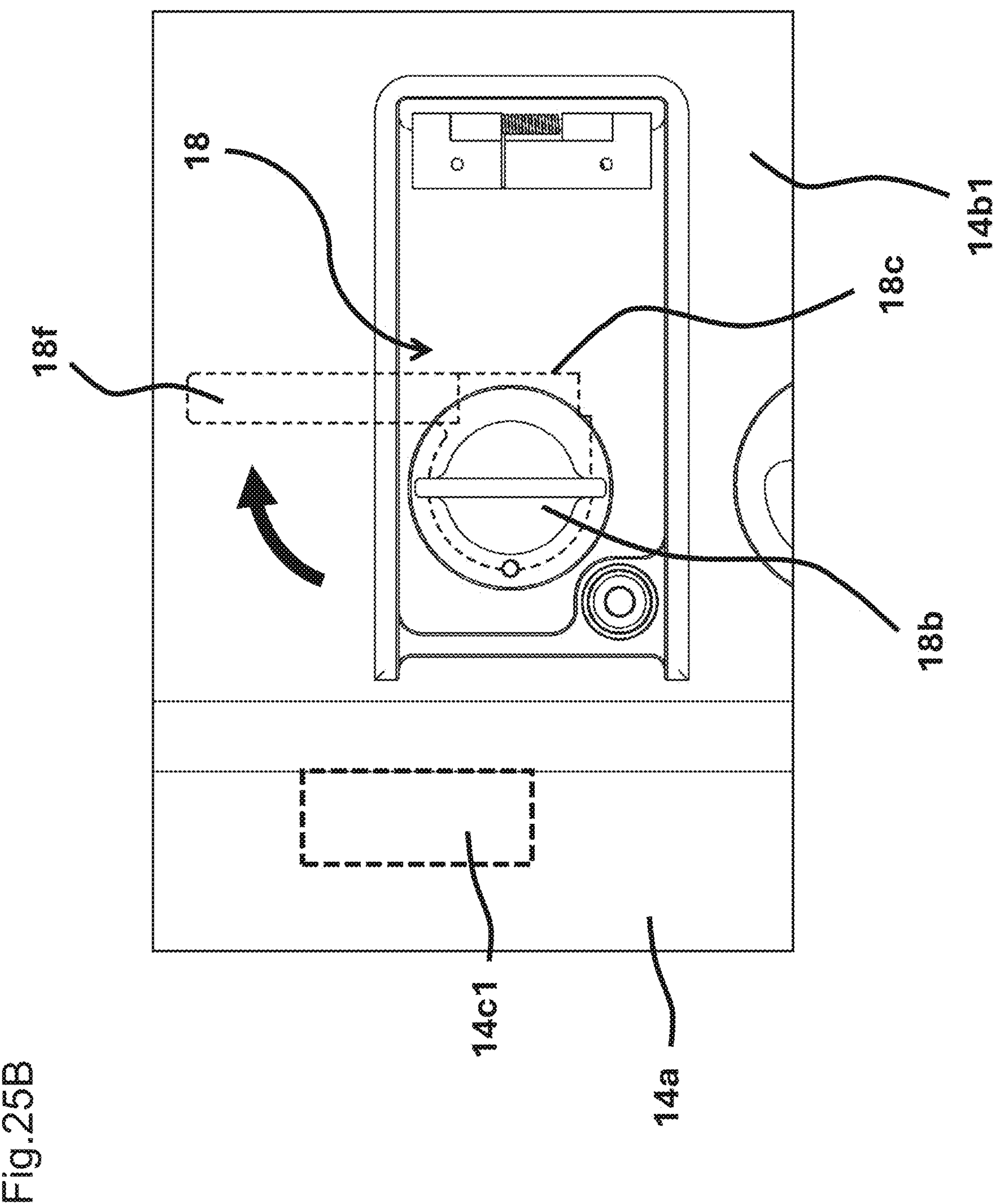
FIG. 25B is a view illustrating the fourth lock mechanism arranged within the space on the inner side of the first panel viewed from the first lavatory compartment side, showing an unlocked state.

FIGS. 23 and 24 are enlarged views illustrating a vicinity of a center of a side portion of the movable wall 14*b* viewed from the first lavatory compartment 11 side. FIGS. 25A and 25B are views illustrating the fourth lock mechanism 18 arranged in a space on the inner side of the first panel 14*b*1 viewed from the first lavatory compartment 11 side.

The first panel 14*b*1 has a small-sized fourth access door 14*b*9 near a side edge adjacent to the supporting wall 14*c* on the first lavatory compartment 11 side. By pushing a button B4, a locking mechanism not shown is released, and the fourth access door 14*b*9 will be in an open state as illustrated in FIG. 24 with respect to the first panel 14*b*1, such that cabin attendants etc. may access the interior thereof. Meanwhile, by closing the fourth access door 14*b*9 with respect to the first panel 14*b*1 and pushing the button B4, the locking mechanism is activated, and cabin attendants etc. may not access the interior thereof. The fourth lock mechanism 18 is arranged in a space on the inner side of the fourth access door 14*b*9.

The fourth lock mechanism 18 adopts a similar configuration as the third lock mechanism 17. More specifically, in FIGS. 25A and 25B, the fourth lock mechanism 18 includes a pivot shaft (not shown) that may pivot with respect to the first panel 14*b*1, a handle 18*b* fixed to the pivot shaft on the first lavatory compartment 11 side, and a cam portion 18*c* that pivots together with the handle 18*b*. The cam portion 18*c* includes an engagement key 18*f* that extends in a tangential direction of an outer circumference. A slit shaped engagement recess portion 14*cl* is formed on the fixed wall 14*a* in correspondence with the engagement key 18*f*. The engagement key 18*f* has an anchor shaped tip, and the anchor shaped tip is preferably enabled to enter to or recede from a transverse groove formed to the interior of the engagement recess portion 14*cl* along with the rotational movement.

In a state where the handle 18*b* is pivoted to a position illustrated in FIG. 25A, the engagement key 18*f* heads toward the horizontal direction, and enters the engagement recess portion 14*cl*. Thereby, the second panel 14*b*2 is disabled from relatively moving with respect to the fixed wall 14*a*. Meanwhile, when the handle 18*b* is pivoted to the position illustrated in FIG. 25B, the engagement key 18*f* is pointed directly above and separates from the engagement recess portion 14*cl*, such that the first panel 14*b*1 is enabled to move relatively with respect to the fixed wall 14*a*.

(Operation of Lock Mechanism)

Next, an operation of the respective lock mechanisms according to the present embodiment will be descried. At first, in a position, i.e., closed position, where the movable wall 14*b* is abutted against the fixed wall 14*a* of the intermediate wall 14, as illustrated in FIG. 2, an outer edge of the movable wall 14*b* is in close contact without any gap with the fixed wall 14*a*, the ceiling 21, the floor 22, and the supporting wall 14*c*, as illustrated in FIG. 6. Thereby, the first lavatory compartment 11 and the second lavatory compartment 12 each constitute a closed chamber space that are partitioned by the intermediate wall 14 and that ensure privacy. Therefore, by opening each of the lavatory doors 11*f* and 12*f*, two passengers may enter the first lavatory compartment 11 and the second lavatory compartment 12 simultaneously, and by closing the lavatory doors 11*f* and 12*f*, the compartments may respectively be used independently, such that both privacy and convenience of passengers may be ensured.

Meanwhile, the spaces within each of the lavatory doors 11*f* and 12*f* are relatively small, such that it is difficult for a passenger on a wheelchair to enter the space and move from the wheelchair to the toilet bowl. Therefore, according to the present embodiment, the movable wall 14*b* of the intermediate wall 14 may be moved to open the space between the first lavatory compartment 11 and the second lavatory compartment 12 to create a wide space. By connecting the spaces of the first lavatory compartment 11 and the second lavatory compartment 12, the passenger that enters the first lavatory compartment 11 on a wheelchair may move beyond the intermediate wall 14*a* and move from the wheelchair to the toilet bowl 12*b*.

However, if any of the passengers may open the intermediate wall 14, there is a risk that the intermediate wall 14 may be opened erroneously, such that privacy may not be ensured. It may be possible to lock the intermediate wall 14 during normal use, and when necessary, a cabin attendant may get a key stored elsewhere to open the lock. However, there is a need to store the key for opening the lock at a position where normal passengers may not access, such that it is troublesome to retrieve the key from the storage location to open the lock.

In contrast, according to the present embodiment, by having a cabin attendant, or a helper assisting the passenger using the wheelchair, remember the necessary lock releasing procedure, the intermediate wall 14 may be easily set to the open state, while there is no risk of having general passengers that do not have the knowledge of the lock releasing procedure open the intermediate wall 14, such that privacy may be ensured. The opening state of the intermediate wall 14 will be described below.

As illustrated in FIG. 2, in a state where the movable wall 14*b* is in contact with the fixed wall 14*a*, the first lock mechanism 15, the second lock mechanism 16, the third lock mechanism 17, and the fourth lock mechanism 18 are all in a locked state.

From such a locked state, for example, after confirming that both the first lavatory compartment 11 and the second lavatory compartment 12 are not used, a cabin attendant serving as an operator may enter the second lavatory compartment 12, push the buttons B1 and B2 illustrated in FIG. 7, and open the first access door 14*b*5 and the second access door 14*b*6 to a state as illustrated in FIG. 8.

Figure 15A:
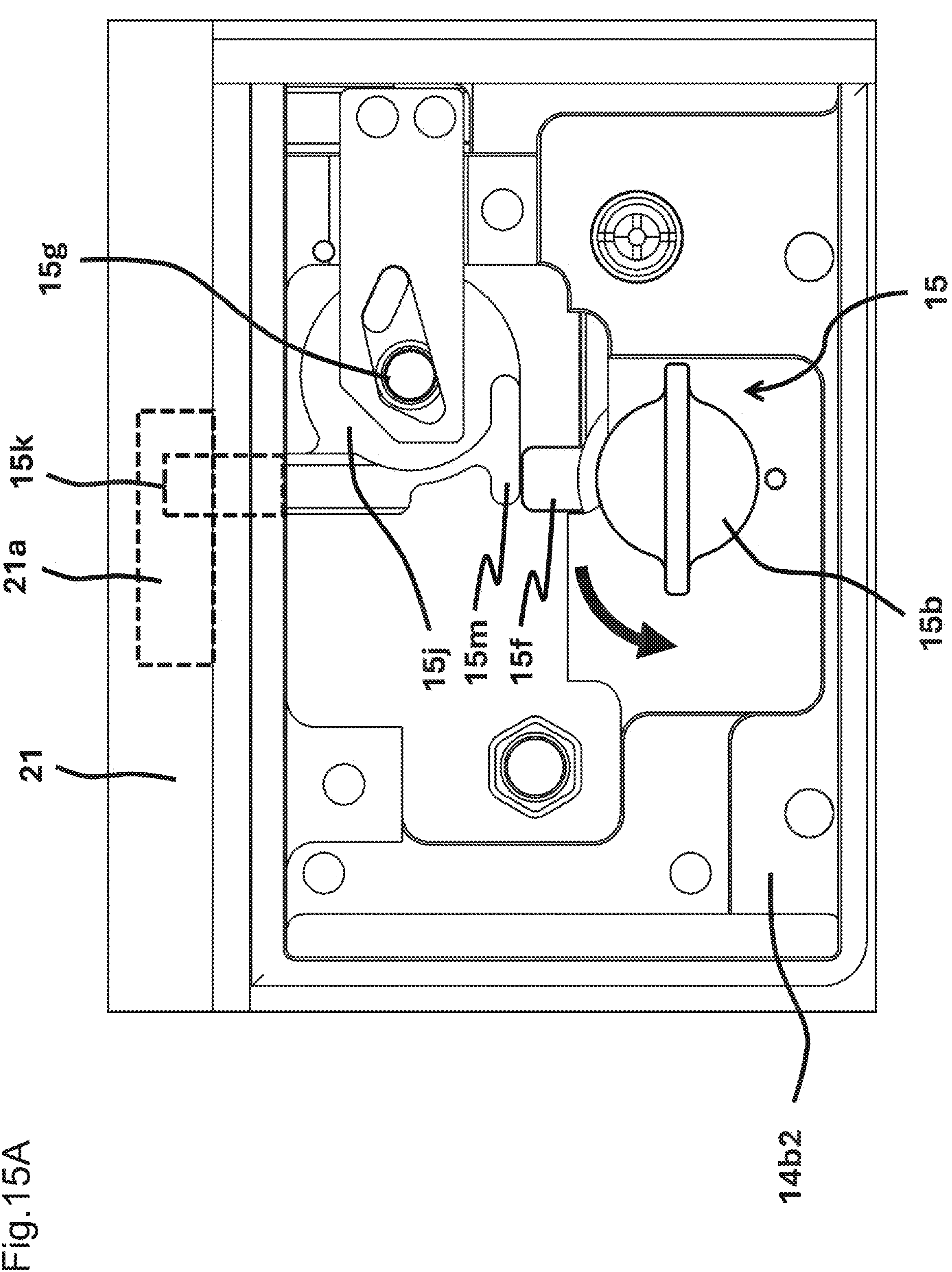
FIG. 15A is a view illustrating the first lock mechanism arranged within the space on the inner side of the second panel viewed from the second lavatory compartment side, showing an engaged state of a first operation member.
Figure 15B:
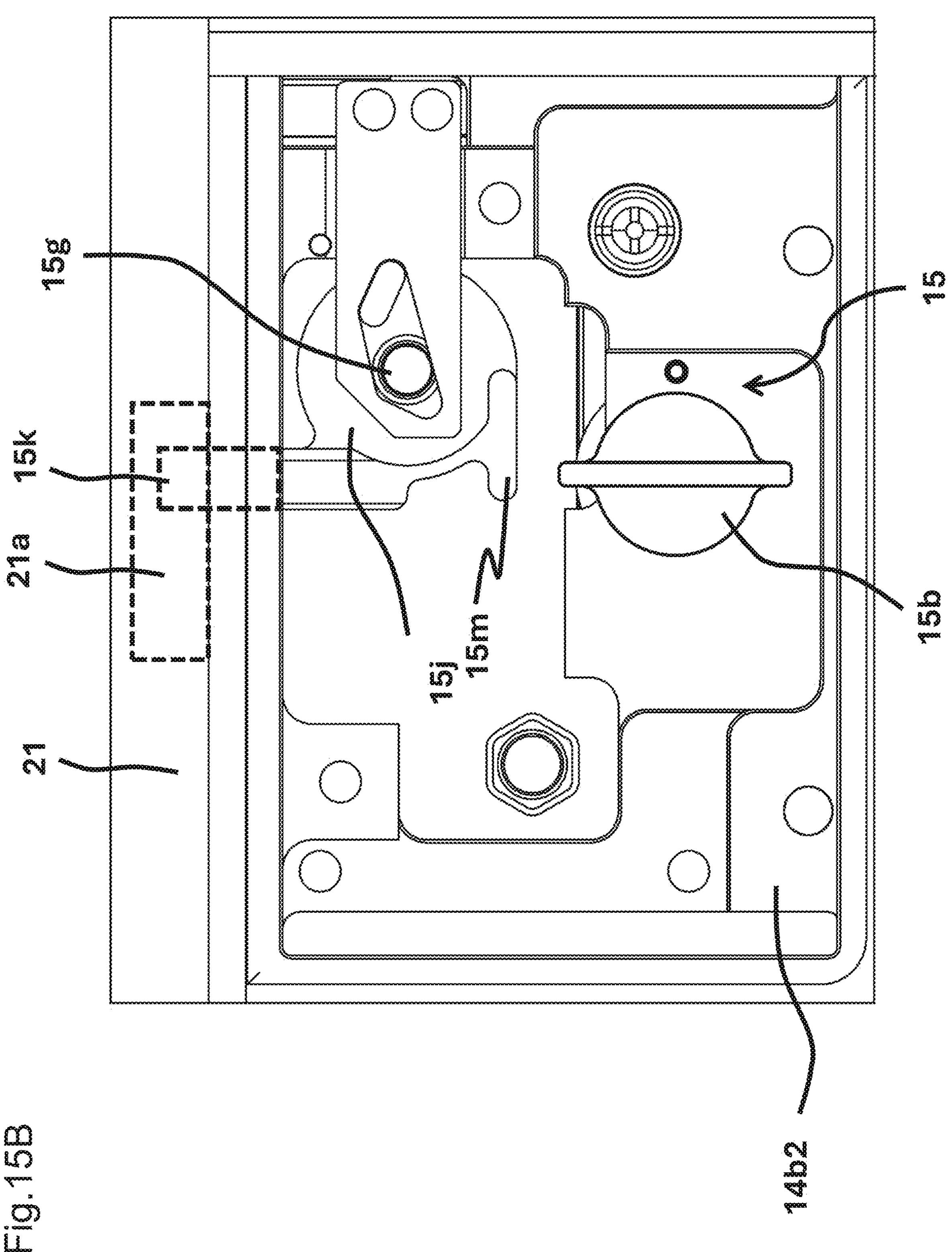
FIG. 15B is a view illustrating the first lock mechanism arranged within the space on the inner side of the second panel viewed from the second lavatory compartment side, showing a separated state of the first operation member.
Figure 16A:
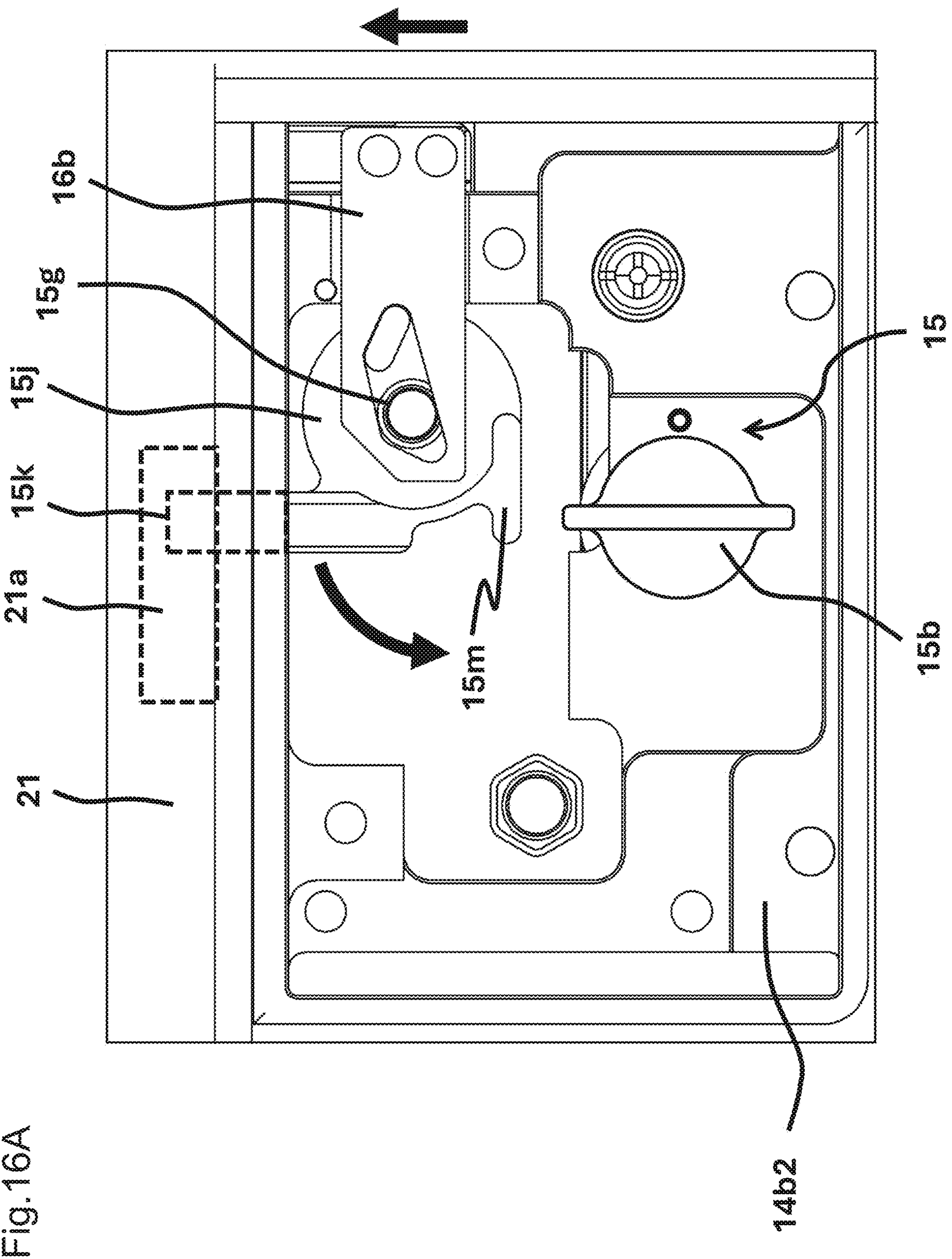
FIG. 16A is a view illustrating the first lock mechanism arranged within the space on the inner side of the second panel viewed from the second lavatory compartment side, showing a locked state of a second operation member.
Figure 16B:
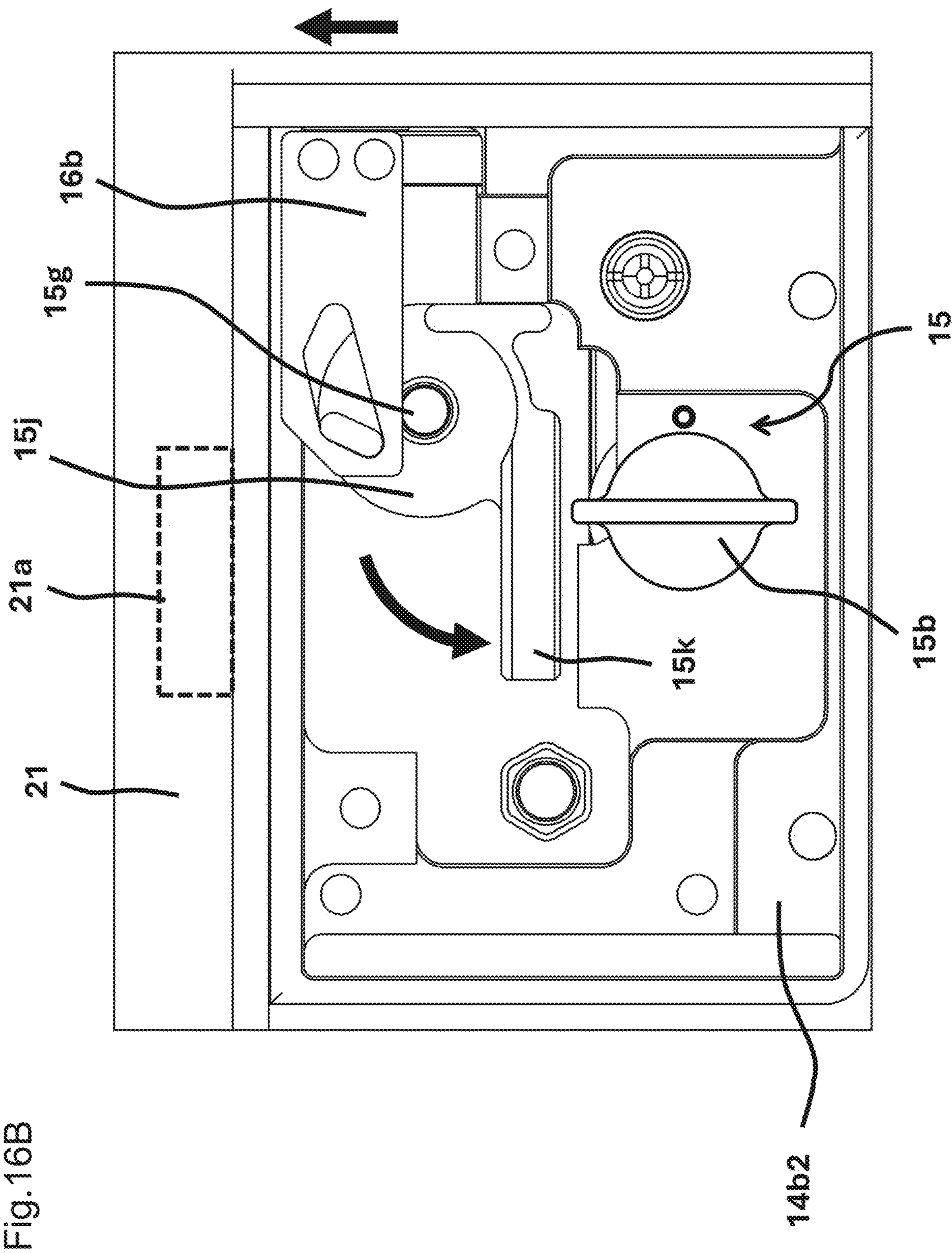
FIG. 16B is a view illustrating the first lock mechanism arranged within the space on the inner side of the second panel viewed from the second lavatory compartment side, showing an unlocked state of the second operation member.

By opening the first access door 14*b*5, the front side handle 15*b* of the first lock mechanism 15 behind the first access door 14*b*5 may be accessed, such that the cabin attendant may operate the front side handle 15*b* and pivot the same in a clockwise direction from the state illustrated in FIGS. 15A and 17 to the state illustrated in FIGS. 15B and 18. Thereby, the protruded portion 15*f* is separated from the hook portion 15*m*. Even when the first access door 14*b*5 is opened, the back-side handle 15*h* may not be accessed from the second lavatory compartment 12. Therefore, the first lock mechanism 15 and the second lock mechanism 16 are maintained in a locked state.

Further, by opening the second access door 14*b*6, the handle 17*b* of the third lock mechanism 17 behind the second access door 14*b*6 may be accessed, such that the cabin attendant may operate the handle 17*b* and pivot the same in a clockwise direction from the state illustrated in FIG. 13 to the state illustrated in FIG. 14. Thereby, the engagement key 17*f* is separated from the engagement recess portion 21*b*, such that the lock of the third lock mechanism 17 is released. Thereafter, the cabin attendant returns the first access door 14*b*5 and the second access door 14*b*6 to their original states.

Next, the cabin attendant may leave the second lavatory compartment 12 and enter the first lavatory compartment 11, press the button B3 illustrated in FIG. 9, and open the third access door 14*b*7 as illustrated in FIG. 10.

By opening the third access door 14*b*7, the back-side handle 15*h* of the first lock mechanism 15 behind the third access door 14*b*7 may be accessed, such that the cabin attendant may operate the back-side handle 15*h* and pivot the same in a clockwise direction from the state illustrated in FIG. 18 to the state illustrated in FIG. 19. Thereby, the engagement key 15*k* is separated from the engagement recess portion 21*a*, and the lower end of the rod 16*a* is separated from the engagement recess portion 22*a*, such that the locks of the first lock mechanism 15 and the second lock mechanism 16 are released. Thereafter, the cabin attendant returns the third access door 14*b*7 to its original state.

Next, the cabin attendant presses the button B4 illustrated in FIG. 23, and opens the fourth access door 14*b*9 as illustrated in FIG. 24.

Furthermore, by opening the fourth access door 14*b*9, the handle 18*b* of the fourth lock mechanism 18 behind the fourth access door 14*b*9 may be accessed, such that the cabin attendant nay operate the handle 18*b* and pivot the same in a clockwise direction from the state illustrated in FIG. 25A to the state illustrated in FIG. 25B. Thereby, the engagement key 18*f* is separated from the engagement recess portion 14*cl*, such that the lock of the fourth lock mechanism 18 is released. Thereafter, the cabin attendant returns the fourth access door 14*b*9 to its original state.

Figure 3:
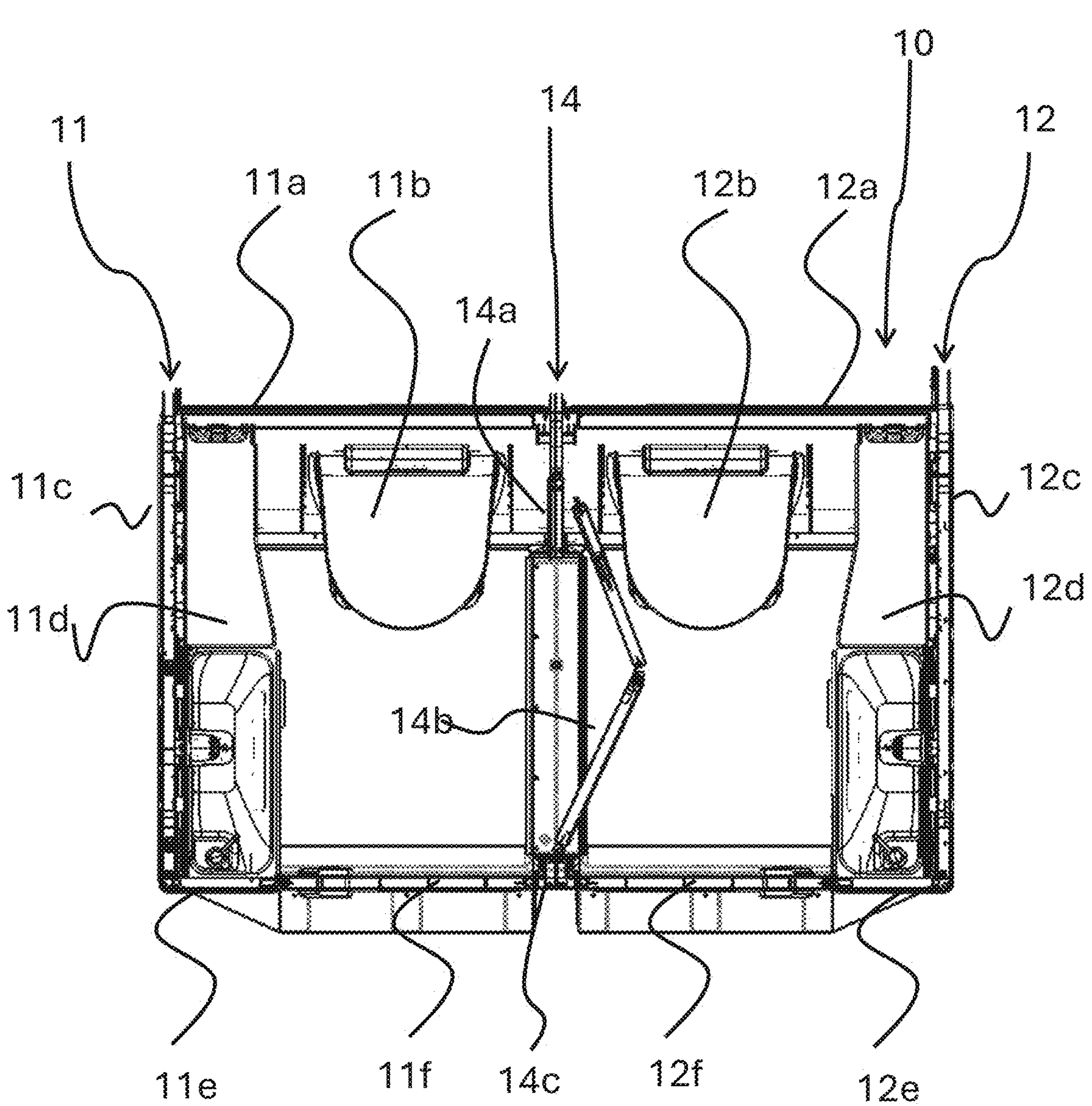
FIG. 3 is a plan view illustrating in enlarged view the lavatory compartment structure according to the embodiment of the present invention, showing a state in which the movable wall is started to be opened.
Figure 4:
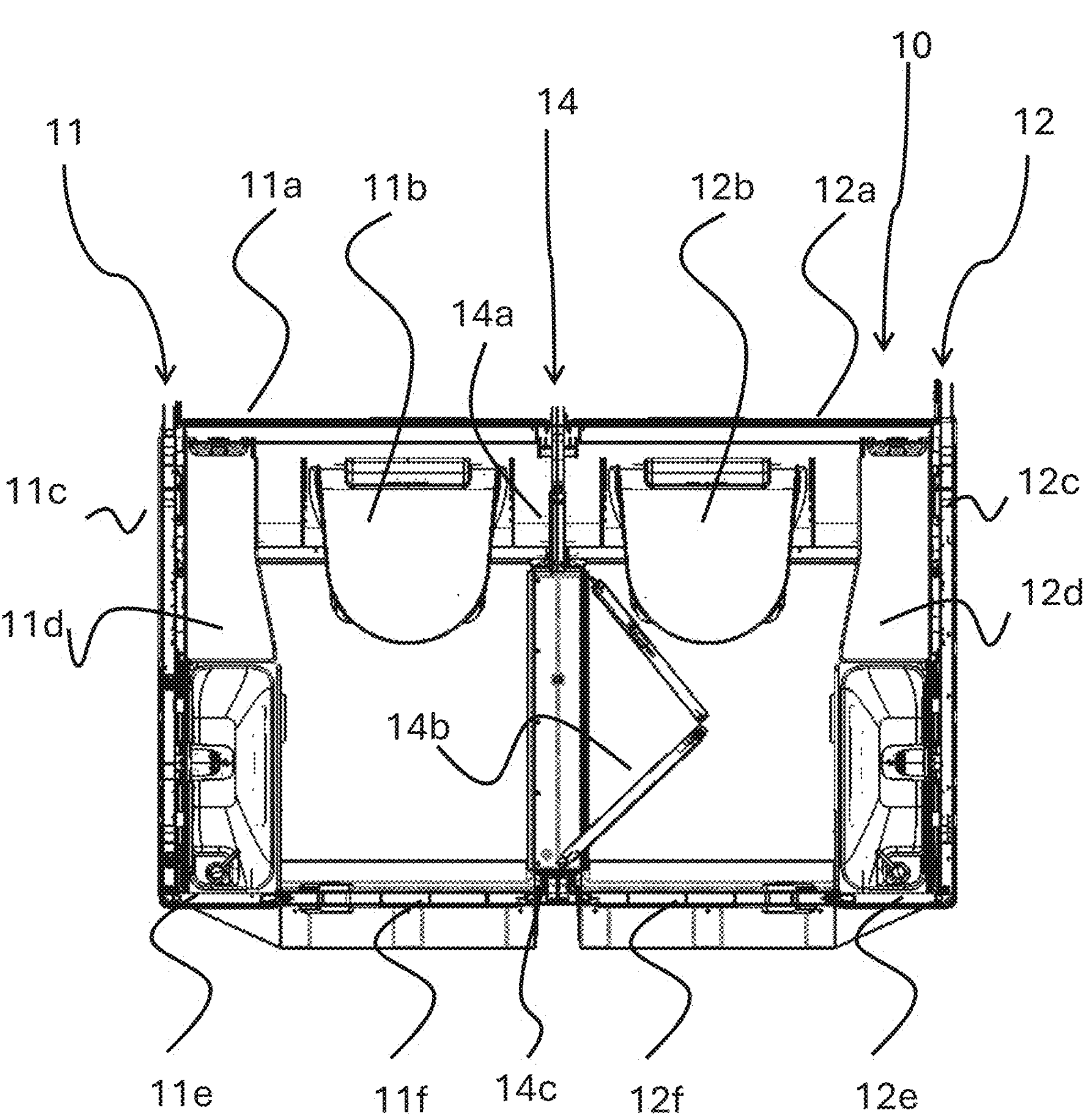
FIG. 4 is a plan view illustrating in enlarged view the lavatory compartment structure according to the embodiment of the present invention, showing a state in which the movable wall is moved to an intermediate position between the closed position and an open position.
Figure 5:
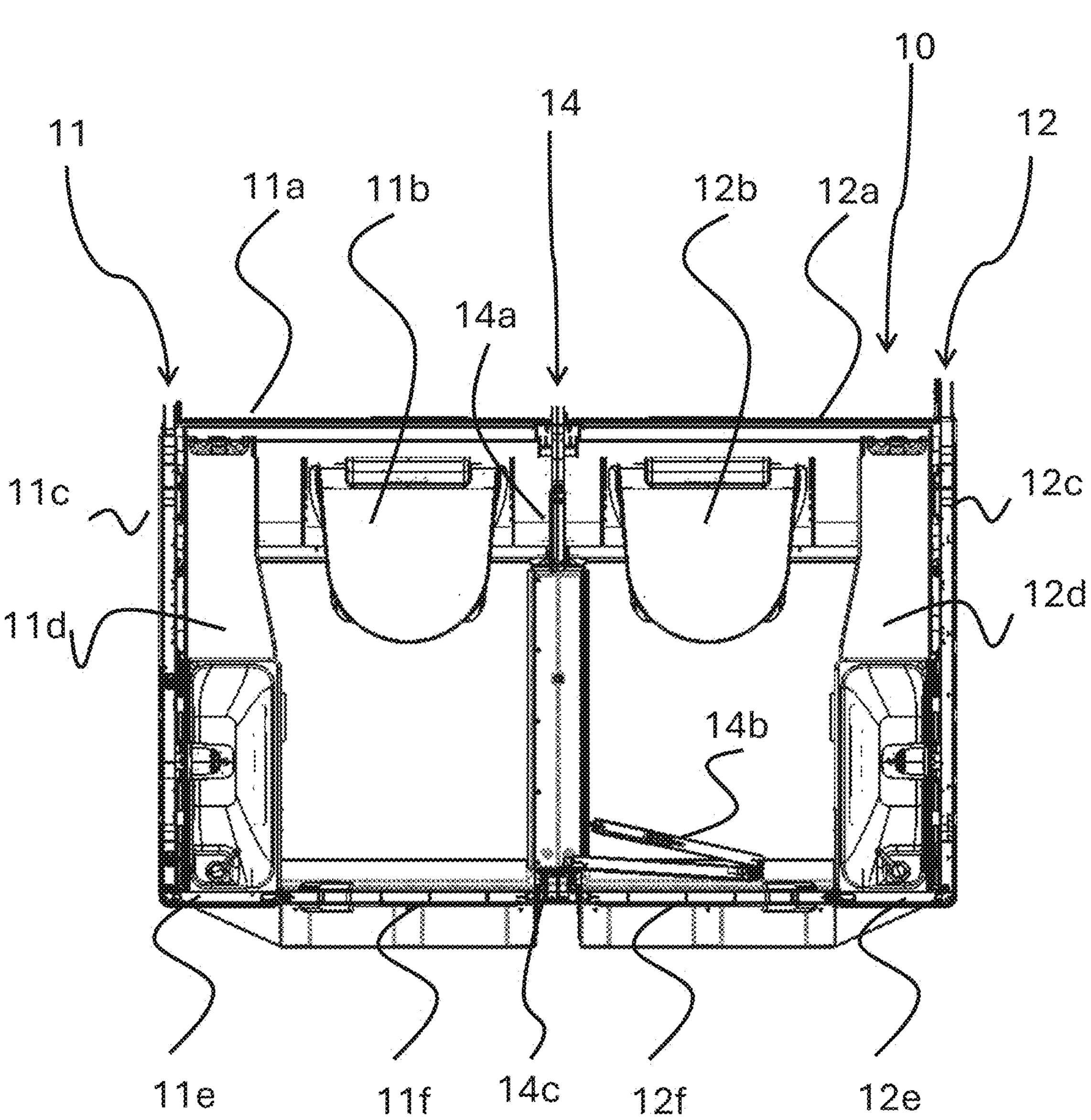
FIG. 5 is a plan view illustrating in enlarged view the lavatory compartment structure according to the embodiment of the present invention, showing a state in which the movable wall is moved to the open position.

By the operations described above, the first lock mechanism 15, the second lock mechanism 16, the third lock mechanism 17, and the fourth lock mechanism 18 are all in a lock released state. The cabin attendant may push the movable wall 14*b* in the lock released state from the first lavatory compartment 11 side toward the second lavatory compartment 12 and fold the movable wall 14*b* as illustrated in FIGS. 3 to 5, according to which the space between the fixed wall 14*a* and the supporting wall 14*c* may be opened.

In this state, the lavatory door 12*f* of the second lavatory compartment 12 will be adjacent to the folded movable wall 14*b*, but the first lavatory compartment 11 may be accessed through the lavatory door 11*f* of the first lavatory compartment 11. Therefore, after the cabin attendant leaves the first lavatory compartment 11, the passenger on the wheelchair may enter the first lavatory compartment 11 through the opened lavatory door 11*f*. After moving off from the wheelchair, the passenger may pass the space between the fixed wall 14*a* and the supporting wall 14*c* to move to the second lavatory compartment 12 and sit on the toilet bowl 12*b*. The lavatory door 11*f* may be closed by the cabin attendant, such that a wide space formed by connecting the first lavatory compartment 11 and the second lavatory compartment 12 will be in a locked state, and privacy can be ensured.

When the passenger wishes to leave the compartment, the passenger may move from the toilet bowl 12*b* to the wheelchair placed in the first lavatory compartment 11, and leave the first lavatory compartment 11 through the lavatory door 11*f* opened by the cabin attendant while riding on the wheelchair. Thereafter, the cabin attendant may return the movable wall 14*b* to a state aligned with the fixed wall 14*a* and the supporting wall 14*c* as illustrated in FIG. 2, and operate the first lock mechanism 15, the second lock mechanism 16, the third lock mechanism 17, and the fourth lock mechanism 18 in an opposite procedure as when releasing the lock, to return them to the locked state. It is clear that if the movable wall 14*b* is not moved to the closed position illustrated in FIG. 2, the engagement key 15*k* may not be engaged with the engagement recess portion 21*a*, the lower end of the rod 16*a* may not be engaged with the engagement recess portion 22*a*, the engagement key 17*f* may not be engaged with the engagement recess portion 21*b*, and the engagement key 18*f* may not be engaged with the engagement recess portion 14*cl*, such that the handles that are interlocked therewith may not be returned to their original positions.

According to the present embodiment, when used by a general passenger, the first lavatory compartment 11 and the second lavatory compartment 12 may be used independently, whereas when used by a passenger on a wheelchair, the movable wall 14*b* may be folded to create a wide space in which the first lavatory compartment 11 and the second lavatory compartment 12 are connected. Thereby, efficient use of the limited space one the aircraft 1 may be realized, and the convenience of passengers may be ensured.

According to the present embodiment, the movable wall 14*b* may not be moved at least if the lock releasing procedures of the first lock mechanism 15 and the second lock mechanism 16 are not known, such that the passengers will not move the movable wall 14*b* by mistake, and the privacy in the first lavatory compartment 11 and the second lavatory compartment 12 may be ensured.

The present invention is not limited to the above embodiments. For example, the lock mechanism may also be released by reversing the intermediate wall 14 and having the cabin attendant perform the operation on the first lavatory compartment 11 side before performing operation on the second lavatory compartment 12 side. Further, it may be possible to provide the first lock mechanism 15 and only either the third lock mechanism 17 or the fourth lock mechanism 18.

The present specification contains disclosure of the following inventions.

(First Aspect)

A lavatory compartment structure of an aircraft characterized in including:

a first lavatory compartment surrounded by a first housing;

a second lavatory compartment adjacent to the first lavatory compartment and surrounded by a second housing;

a movable wall that is movable between a closed position of closing a space between the first lavatory compartment and the second lavatory compartment and an open position of opening the space between the first lavatory compartment and the second lavatory compartment; and a main lock mechanism of the movable wall, wherein the first housing and the second housing constitute a lavatory housing, wherein the main lock mechanism includes:

a first operation member that is operable from one side of either the first lavatory compartment or the second lavatory compartment;

a second operation member that is operable from the other side of the first lavatory compartment or the second lavatory compartment; and a locking portion connected to the second operation member and that is movable between a lock position preventing movement of the movable wall with respect to the lavatory housing, and an unlock position enabling movement of the movable wall with respect to the lavatory housing, wherein, by operating the first operation member, the first operation member may be shifted to either an engaged state in which the first operation member is engaged to the second operation member or a separated state in which the first operation member is separated from the second operation member, and wherein, in the engaged state, the second operation member may not be operated to move the locking portion from the lock position to the unlock position, and in the separated state, the second operation member may be operated to move the locking portion from the lock position to the unlock position.

(Second Aspect)

The lavatory compartment structure of an aircraft according to aspect 1, wherein, when the locking portion is at the lock position, the first operation member may be shifted from the separated state to the engaged state.

(Third Aspect)

The lavatory compartment structure of an aircraft according to aspect 1 or aspect 2, wherein the movable wall has access doors that may be opened and closed arranged on both sides thereof, and the main lock mechanism is disposed between the pair of access doors, and wherein by opening one of the access doors, an operator may access the first operation member, and by opening the other one of the access doors, the operator may access the second operation member.

(Fourth Aspect)

The lavatory compartment structure of an aircraft according to any one of aspects 1 to 3, wherein the first operation member includes a front side handle that may be operated to rotate, and a protruded portion that rotates together with the front side handle, wherein the second operation member includes a back-side handle that may be shifted with respect to a rotation shaft of the front side handle and that may be operated to rotate, and a hook portion that rotates together with the back-side handle, wherein the locking portion is an engagement key that rotates together with the back-side handle and that may be engaged with and separated from an engagement recess portion of the lavatory housing, and wherein the front side handle is rotated to have the protruded portion abut against the hook portion to be shifted to the engaged state, and to have the protruded portion separate from the hook portion to be shifted to the separated state.

(Fifth Aspect)

The lavatory compartment structure of an aircraft according to the fourth aspect, wherein the second operation member further includes a link plate connected to the back-side handle, and a rod connected to the link plate, and wherein the rod is moved to an axial direction by a drive force transmitted via the link plate by the rotation of the back-side handle, and may be engaged with and disengaged from an engagement recess portion of the lavatory housing positioned on an opposite side as the locking portion in an up-down direction interposing the movable wall.

(Sixth Aspect)

The lavatory compartment structure of an aircraft according to any one of aspects 1 to 5, wherein the movable wall is arranged between a fixed wall and a supporting wall connected to the lavatory housing, the movable wall including a first panel, and a second panel that may be pivoted with respect to the first panel, wherein the second panel is connected in a pivotable manner to the supporting wall.

(Seventh Aspect)

The lavatory compartment structure of an aircraft according to aspect 6, wherein the main lock mechanism is disposed on the second panel, and a sub-lock mechanism that prevents relative movement of the first panel with respect to the lavatory housing is disposed on the first panel in a manner independent from the main lock mechanism.

DESCRIPTION OF THE REFERENCE NUMERAL

1 aircraft
2 seat unit
3 vertical aisle
4 aircraft body door
10 lavatory compartment structure
11 first lavatory compartment
12 second lavatory compartment
14 intermediate wall
15 first lock mechanism
16 second lock mechanism
17 third lock mechanism
18 fourth lock mechanism
21 ceiling
22 floor

The invention claimed is:

1. A lavatory compartment structure of an aircraft comprising:

a first lavatory compartment surrounded by a first housing;

a second lavatory compartment adjacent to the first lavatory compartment and surrounded by a second housing;

a movable wall that is movable between a closed position of closing a space between the first lavatory compartment and the second lavatory compartment and an open position of opening the space between the first lavatory compartment and the second lavatory compartment; and a main lock mechanism of the movable wall, wherein the first housing and the second housing constitute a lavatory housing, wherein the main lock mechanism includes:

a first operation member that is operable from one side of either the first lavatory compartment or the second lavatory compartment;

a second operation member that is operable from the other side of the first lavatory compartment or the second lavatory compartment; and a locking portion connected to the second operation member and that is movable between a lock position preventing movement of the movable wall with respect to the lavatory housing, and an unlock position enabling movement of the movable wall with respect to the lavatory housing, wherein, by operating the first operation member, the first operation member may be shifted to either an engaged state in which the first operation member is engaged to the second operation member or a separated state in which the first operation member is separated from the second operation member, and wherein, in the engaged state, the second operation member may not be operated to move the locking portion from the lock position to the unlock position, and in the separated state, the second operation member may be operated to move the locking portion from the lock position to the unlock position.

2. The lavatory compartment structure of an aircraft according to claim 1, wherein, when the locking portion is at the lock position, the first operation member may be shifted from the separated state to the engaged state.

3. The lavatory compartment structure of an aircraft according to claim 1, wherein the movable wall has access doors that may be opened and closed arranged on both sides thereof, and the main lock mechanism is disposed between the pair of access doors, and wherein by opening one of the access doors, an operator may access the first operation member, and by opening the other one of the access doors, the operator may access the second operation member.

4. The lavatory compartment structure of an aircraft according to claim 1, wherein the first operation member includes a front side handle that may be operated to rotate, and a protruded portion that rotates together with the front side handle, wherein the second operation member includes a back-side handle that may be shifted with respect to a rotation shaft of the front side handle and that may be operated to rotate, and a hook portion that rotates together with the back-side handle, wherein the locking portion is an engagement key that rotates together with the back-side handle and that may be engaged with and separated from an engagement recess portion of the lavatory housing, and wherein the front side handle is rotated to have the protruded portion abut against the hook portion to be shifted to the engaged state, and to have the protruded portion separate from the hook portion to be shifted to the separated state.

5. The lavatory compartment structure of an aircraft according to claim 4, wherein the second operation member further includes a link plate connected to the back-side handle, and a rod connected to the link plate, and wherein the rod is moved to an axial direction by a drive force transmitted via the link plate by the rotation of the back-side handle, and may be engaged with and disengaged from an engagement recess portion of the lavatory housing positioned on an opposite side as the locking portion in an up-down direction interposing the movable wall.

6. The lavatory compartment structure of an aircraft according to claim 1, wherein the movable wall is arranged between a fixed wall and a supporting wall connected to the lavatory housing, the movable wall including a first panel, and a second panel that may be pivoted with respect to the first panel, wherein the second panel is connected in a pivotable manner to the supporting wall.

7. The lavatory compartment structure of an aircraft according to claim 6, wherein the main lock mechanism is disposed on the second panel, and a sub-lock mechanism that prevents relative movement of the first panel with respect to the lavatory housing is disposed on the first panel in a manner independent from the main lock mechanism.

* * * * *